(12) United States Patent
Hwang et al.

(10) Patent No.: US 11,647,147 B2
(45) Date of Patent: May 9, 2023

(54) USER-SPECIFIC CUSTOMIZATION OF VIDEO CONFERENCES USING MULTIMODAL BIOMETRIC CHARACTERIZATION

(71) Applicant: Meta Platforms, Inc., Menlo Park, CA (US)

(72) Inventors: Eric W. Hwang, San Jose, CA (US); Saurabh Mitra, Mountain View, CA (US); Jeffrey Zhang, Sugar Land, TX (US); Alan Liu, Menlo Park, CA (US); Rahul Nallamothu, Mountain View, CA (US); Samuel Franklin Pepose, Redwood City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 176 days.

(21) Appl. No.: 17/135,755

(22) Filed: Dec. 28, 2020

(65) Prior Publication Data

US 2022/0210341 A1   Jun. 30, 2022

(51) Int. Cl.
*H04N 5/262* (2006.01)
*G06V 40/16* (2022.01)
(Continued)

(52) U.S. Cl.
CPC ............ *H04N 5/262* (2013.01); *G06V 40/10* (2022.01); *G06V 40/172* (2022.01); *G06V 40/50* (2022.01);
(Continued)

(58) Field of Classification Search
CPC ....................................................... H04N 5/262
(Continued)

(56) References Cited

U.S. PATENT DOCUMENTS 11,017,203 B1 *   5/2021   Aggarwal ............... G06V 40/70
2019/0371323 A1 * 12/2019   Kao ....................... G06V 40/168

OTHER PUBLICATIONS

International Search Report and Written Opinion for International Application No. PCT/US2021/064957 dated Apr. 5, 2022, 12 pages.
(Continued)

*Primary Examiner* — Joel W Fosselman
(74) *Attorney, Agent, or Firm* — Baker Botts L.L.P.

(57) ABSTRACT

In one embodiment, a method includes an intelligent communication device detecting that a person is visible to a camera of the device, determining a first biometric characteristic of the person discernable by the device, associating the first biometric characteristic with a user identifier unique to the person, determining, while the person is identifiable based on the first biometric characteristic, a second biometric characteristic of the person discernable by the device, and associating the second biometric characteristic with the user identifier. The method also includes the device determining that a detected person has a detected biometric characteristic, determining that the detected person is associated with the user identifier by matching the detected biometric characteristic to the first biometric characteristic or the second biometric characteristic, and applying, while the detected person is identifiable based on the detected biometric characteristic, a user-specific customization associated with the user identifier.

18 Claims, 12 Drawing Sheets

(51) Int. Cl.
*G06V 40/10* (2022.01)
*G06V 40/70* (2022.01)
*G06V 40/50* (2022.01)
*G10L 17/00* (2013.01)
*G10L 21/003* (2013.01)
*H04N 5/232* (2006.01)
*H04N 7/15* (2006.01)

(52) U.S. Cl.
CPC .............. *G06V 40/70* (2022.01); *G10L 17/00* (2013.01); *G10L 21/003* (2013.01); *H04N 5/23229* (2013.01); *H04N 7/15* (2013.01)

(58) Field of Classification Search
USPC ...................................................... 348/222.1
See application file for complete search history.

(56) References Cited

OTHER PUBLICATIONS

Motlicek P., et al., "Real-Time Audio-Visual Analysis for Multi Person Video Conferencing," Advances in Multimedia, vol. 2013, No. 6, Jan. 1, 2013, 21 pages.

\* cited by examiner

USER-SPECIFIC CUSTOMIZATION OF VIDEO CONFERENCES USING MULTIMODAL BIOMETRIC CHARACTERIZATION

TECHNICAL FIELD

This disclosure generally relates to video conferencing and, more particularly, to systems and methods for applying user-specific customizations in audio/visual communication sessions based on multimodal biometric characteristics of detected users.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include information that the user has entered. The information may be public or private, depending on the user's privacy settings, and may include, communication-channel information, and. The social-networking system may also, with input and permission from a user, provide services (e.g., wall posts, photo-sharing, event organization, messaging, games, or advertisements) to facilitate social interaction between or among users.

The social-networking system may send content or messages related to its services over one or more networks to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device, such as a smartphone, tablet computer, laptop computer, or dedicated audio/visual communication interface, may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

An intelligent communication device may be used for audio/visual communications, such as live or video chats or pre-recorded audio/visual presentations. The intelligent communication device may be a dedicated communication device that resides in a user's home or office. The intelligent communication device may have a touch sensitive display screen, speakers, one or more cameras and one or more microphones. The intelligent communication device may have internal processing capability that enables it to apply user-specific video conference customizations that are spatially and contextually aware using multimodal biometric characterization. For example, user-specific customizations may be applied to the video and/or audio output generated by the device during a live audio/visual communication session ("AV communication session") based on identifying and tracking users in the device's environment across space and time. The device may access user information in accordance with privacy settings specified by the device's owner and/or each user that comes within the visual field of the device.

Per-user customizations may be applied based on multimodal biometric signals that identify particular users with higher confidence than is possible using only a single biometric signal, such as a facial recognition result, alone. Once a particular user is identified, they may be tracked as they move into and around the scene visible to the device over time based on their unique user identifier. The multimodal biometric signals may include, for example, a face detection result, a facial recognition result, a voice detection result, a voice recognition result, a beamforming signal indicative of the direction from which an audio signal is received (i.e., spatial information), a signal received from a depth sensor, a signal received from a 3D scanner, a signal received from a fingerprint scanner (e.g., on a remote control for the device), a signal received from a geolocation device, or an output of a computer vision system. Any number of these biometric signals may be associated with a unique identifier for a particular user in a data structure representing descriptive model of a current AV communication session between two or more users that maintains up-to-date information about various people in the environment, such as those detectable by the device through the camera or other sensors. Once two or more of these signals are associated with a particular user, any one or more of them may be used to identify the user in a scene, regardless of whether other biometric signals associated with the user are discernable. Typical behaviors of a particular user, such as a typical gait, pose, or movement, whether observed either generally or only in certain locations or contexts, may be learned based on any number or combination of the multimodal biometric signals associated with their unique user identifier.

The descriptive model may include, subject to privacy settings of the device owners and each of the relevant users, (1) identifying or non-identifying information related to the environment in which the sending intelligent communication device is located; (2) identifying or non-identifying information about one or more people located in the sending device's environment, including multimodal biometric characteristics, as described herein; (3) identifying or non-identifying information related to the environment in which the recipient's intelligent communication device is located; (4) identifying or non-identifying information about one or more people located in the recipient device's environment; and (5) identifying or non-identifying information about the context surrounding the current AV communication session. Based on these inputs as well as other manual inputs from any participating user and privacy settings by any of the captured users, the device may apply user-specific customizations to the video and/or audio output generated by the device during an AV communication session. A passive scheduler may determine when and how often to update the multimodal biometric information associated with each user in the descriptive model and may schedule biometric readings accordingly to ensure efficient use of system resources for updates to the descriptive model.

In particular embodiments, a method for applying user-specific customizations in audio/visual communication sessions based on multimodal biometric characteristics of detected users may include detecting that a person is visible to a camera of the device, determining a first biometric characteristic of the person discernable by the device, and associating the first biometric characteristic with a user identifier that is unique to the person and is persistent for at least the duration of a current AV communication session. The method may also include, while the person is identifiable based on the first biometric characteristic, determining a second biometric characteristic of the person discernable by the device and associating the second biometric characteristic with the user identifier. After associating both the first and second biometric characteristics with a unique user identifier in a descriptive model of the current AV communication session, the method may include determining that a detected person has a detected biometric characteristic, determining that the detected person is associated with the user identifier by matching the detected biometric characteristic to the first biometric characteristic or the second biometric characteristic, and, while the detected person is identifiable based on the detected biometric characteristic, applying a user-specific customization associated with the user identifier. For example, the device may apply user-specific customizations to the video and/or audio output generated by the device during an AV communication session The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
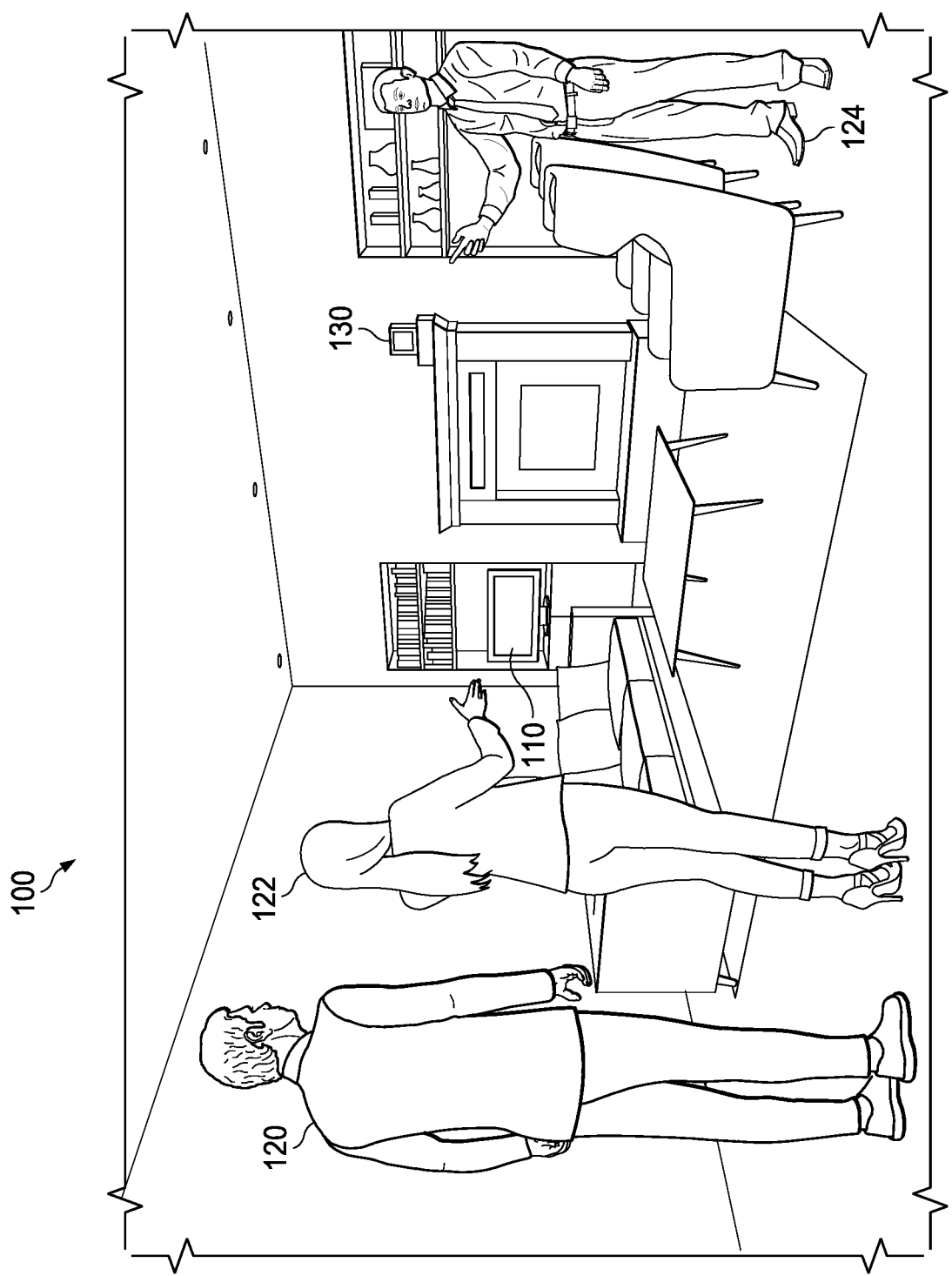
FIG. 1 illustrates an example intelligent communication device in an example living room setting.

An intelligent communication device may be used for audio/visual communications, such as live or video chats or pre-recorded audio/visual presentations. The intelligent communication device may be a dedicated communication device that resides in a user's home or office. The intelligent communication device may have a touch sensitive display screen, speakers, one or more cameras, which may include a camera having a lens with a wide field of view, and one or more microphones, which may include a phased microphone for directional audio, such that the device can determine from where, within its environment, sound is coming. The intelligent communication device may also include, or be communicably coupled to, one or more other biometric sensors from which biometric characteristics of persons detectable by the device may be obtained. As described in detail herein, the intelligent communication device may include internal processing capability that enables it to apply user-specific audio/visual customizations using multimodal biometric characterization. For example, user-specific customizations may be applied to the video and/or audio output generated by the device during a live audio/visual communication session ("AV communication session") based on identifying and tracking users in the device's environment across space and time. The device may access user information in accordance with privacy settings specified by the device's owner and/or each user that comes within the visual field of the device.

Per-user customizations may be applied based on multimodal biometric signals that identify particular users with higher confidence than is possible using only a single biometric signal, such as a facial recognition result, alone. These blended biometric signals may indicate who and where persons are in the environment of the device with very high confidence. Once a particular user is identified, they may be tracked as they move into and around the scene visible to the device over time based on their unique user identifier. The multimodal biometric signals may include, for example, a face detection result, a facial recognition result, a voice detection result, a voice recognition result, a beamforming signal indicative of the direction from which an audio signal is received (i.e., spatial information), a signal received from a depth sensor, a signal received from a 3D scanner, a signal received from a fingerprint scanner (e.g., on a remote control for the device), a signal received from a geolocation device, or an output of a computer vision system. Any number of these biometric signals may be associated with a unique identifier for a particular user in a data structure representing descriptive model of a current AV communication session between two or more users that maintains up-to-date information about various people in the environment, such as those detectable by the device through the camera or other sensors. Once two or more of these signals are associated with a particular user, any one or more of them may be used to identify the user in a scene, regardless of whether other biometric signals associated with the user are discernable. Typical behaviors of a particular user, such as a typical gait, pose, or movement, whether observed either generally or only in certain locations or contexts, may be learned based on any number or combination of the multimodal biometric signals associated with their unique user identifier.

In particular embodiments, a method for applying user-specific customizations in audio/visual communication sessions based on multimodal biometric characteristics of detected users may include detecting that a person is visible to a camera of the device, determining a first biometric characteristic of the person discernable by the device, and associating the first biometric characteristic with a user identifier that is unique to the person and is persistent for at least the duration of a current AV communication session. The method may also include, while the person is identifiable based on the first biometric characteristic, determining a second biometric characteristic of the person discernable by the device and associating the second biometric characteristic with the user identifier. Each of the first and second biometric characteristics may, for example, be a persistent characteristic associated with the person, a transient characteristic associated with the person, or a current contextual characteristic associated with the person. After associating both the first and second biometric characteristics with a unique user identifier in a descriptive model of the current AV communication session, the method may include determining that a detected person has a detected biometric characteristic, determining that the detected person is associated with the user identifier by matching the detected biometric characteristic to the first biometric characteristic or the second biometric characteristic, and, while the detected person is identifiable based on the detected biometric characteristic, applying a user-specific customization associated with the user identifier. Examples of the user-specific customizations that may be applied by the device include, but are not limited to, raising the volume of a particular person who speaks softly using beamforming to boost the audio signal coming from their direction or otherwise enhancing the quality of the audio signal coming from their direction, applying an audio effect to the voice of a particular person (such as scrambling or otherwise disguising their voice, or causing their voice to sound like Darth Vader, Mickey Mouse, or a person who has inhaled helium), blurring the face of a particular person (e.g., a child) for privacy, adding artificial reality (AR) effects to a particular person's appearance (such as adding a hat or rabbit ears on their head, or adding a mask to their face), modifying the background against which a particular person is depicted, or editing a particular person out of the video output entirely using background replacement or any of various segmentation techniques.

FIG. 1 illustrates an example intelligent communication device in an example living room setting. Note that "intelligent communication system 130" may also be referred to herein as "client system 130," and these terms may be used interchangeably throughout this disclosure. Although FIG. 1 illustrates the example environment as a living room setting, this is merely an example of where the intelligent communication device may be located. It is contemplated that intelligent communication device 130 may be located in any suitable setting indoors or outdoors, including the kitchen, bedrooms, hallways, backyards, parks, the beach, or any other environment. The environment 100 may include the intelligent communication device 130 and many other types of objects, including persons 120, 122, and 124, and furniture, including television 110. In order for device controller 132 to make appropriate customization decisions, the intelligent communication device may be enabled to differentiate between background objects, such as walls, furniture, appliances, doors, doorways, ceiling fans, chandeliers, etc., and foreground objects, such as people, pets, or inanimate objects (e.g., a television, a radio, or a toy). In the illustrated example, person 120 and person 122 are facing intelligent communication device 130, which may be able to identify them using facial recognition technology. However, person 124 is turned away from intelligent communication device 130 and might not be identifiable by the device using facial recognition technology. As described in more detail herein, intelligent communication device 130 may identify and track people, such as persons 120, 122, and 124, as they move in and out of view of intelligent communication device 130 during an AV communication session based on multimodal biometric characteristics associated with those people, and may apply user-specific customizations to the video and/or audio portions of a video stream generated by the device.

Figure 2:
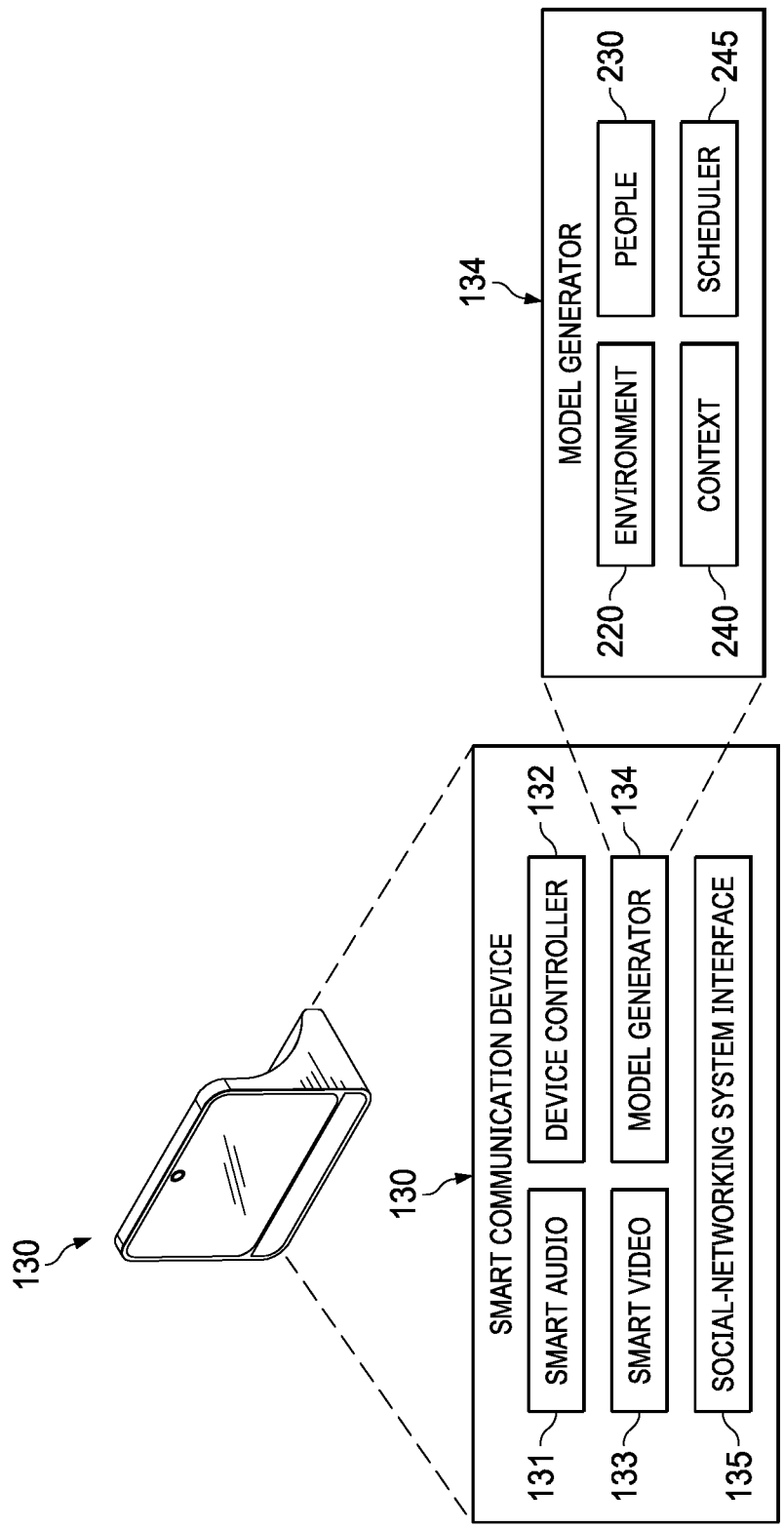
FIG. 2 illustrates an example intelligent communication device with example components.

FIG. 2 illustrates an example intelligent communication device 130 with example components. Example components include a smart audio component 131, a device controller 132, a smart video component 133, a model generator 134, and a social-networking interface 135. Each of the components may include or use suitable processing and storage units to perform the functions discussed in this disclosure. For example, device controller 132 may include internal processing capability that enables it to apply user-specific video conference customizations that are spatially and contextually aware using multimodal biometric characterization, as described in more detail below. The following discussion of model generator 134 and its associated modules and their functionality are subject to privacy settings of (1) the owner of the intelligent communication device 130, and/or (2) each user who is within the visual or audio space of the intelligent communication device 130. For example, the device owner may specify that under no circumstances may the device access information about anyone that is stored by the social-networking system. In this scenario, the device would not communicate with remote servers with regard to any type of user information. As another example, the device owner may specify that the device may access information stored by the social-networking system to enhance the user's experience, such as by applying user-specific customizations to a video stream output by the device. In this scenario, the device may communicate with the social-networking system with regard to the device owner's social-networking data, but the device will continue to check for permission to access other user's social-networking data. For example, if the device owner has opted into social-networking data access, but the device owner's friend has not opted in, the device will not access the friend's social-networking data. At a minimum, the device may identify a user for the limited purpose of determining whether the user allows access to his or her social-networking information or other identifying information. If the user does not allow such access, the device will not identify the user for any other purpose. Such privacy settings may be configured by the user on a settings interface associated with an account of the user on the online social network, as is discussed herein.

Model generator 134 may include four modules: an environment module 220, a people module 230, a context module 240, and a model maintenance scheduler, shown as scheduler 245. Environment module 220 may generate information about the current environment in which the intelligent communication device 130 is operating during a current AV communication session. As an example and not by way of limitation, environment module 220 may determine that the device's environment is indoors, and, subject to privacy settings of the device owner and/or any relevant user, may also determine various characteristics of the environment, such as the locations of walls, walkways, and furniture. In another example, environment module 220 may determine that the device's environment is inside the device owner's home or in a particular room in the device owner's home. In yet another example, environment module 220 may determine that the device's environment is outdoors or in another location other than the device owner's home. This information may be gathered to enhance the viewing experience of viewing participants by enabling the device controller 132 to make more intelligent user-specific customization decisions, such as by applying different user-specific customizations dependent on the location and/or environment in which intelligent communication device 130 is operating. In at least some embodiments, this information remains on the device 130 and is not sent to any remote server. This information may be included in a descriptive model of the current AV communication session, which is discussed in more detail with reference to FIG. 5 below.

People module 230 may generate information about the people in the environment. Only if the device owner and/or relevant users have expressly opted into sharing their information (e.g., social-networking information and various persistent, transient, or contextual biometric characteristics), the information about the people stored in the generated model may be shared via social-networking system interface 135. People module 230 may generate information for the descriptive model of the current AV communication session, which is discussed in more detail with reference to FIG. 5 below. If the device owner and/or relevant users have opted into sharing their information (e.g., social-networking information and various persistent, transient, or contextual biometric characteristics), context module 240 may generate information about the context of a particular AV communication session, such as the date or time of the AV communication session, the location or specific room in which the AV communication session is taking place, the number of participants in the AV communication session, the location and orientation of each intelligent communication device, or the relationship between AV communication session participants (e.g., spouses, coworkers, schoolmates). In particular embodiments, if the users have expressly opted in to sharing social-networking information, context module 240 may receive social-networking information about the users who are participating in the AV communication session from the social-networking system via the social-networking system interface 135. As described in more detail below, scheduler 245 may determine when and whether to request updated information about the people participating in the current AV communication session from a camera, microphone, or other biometric sensor associated with device 130 in a manner that makes efficient use of device resources.

In particular embodiments, an AV communication session may involve an intelligent communication device 130 and at least one other device, which may be another intelligent communication device 130 or any other communication device, such as a smartphone, laptop computer, tablet, or a VR device. During the AV communication session, each participating intelligent communication device may both (1) send audio and visual data to the other participating devices, and (2) receive audio and visual data from the other participating devices. Thus, each participating intelligent communication device may be both a sending device and a receiving device. As an example and not by way of limitation, an AV communication session may include four intelligent communication devices among four different users. Each of those devices may send audio and visual data to the other three devices and may receive audio and visual data from the other three devices. Although this disclosure uses the terms "sending device," "sending user," "receiving device," and "receiving user," this disclosure contemplates that each device and user is both a sender and a receiver, because in an AV communication session, all devices send and receive information.

Figure 3B:
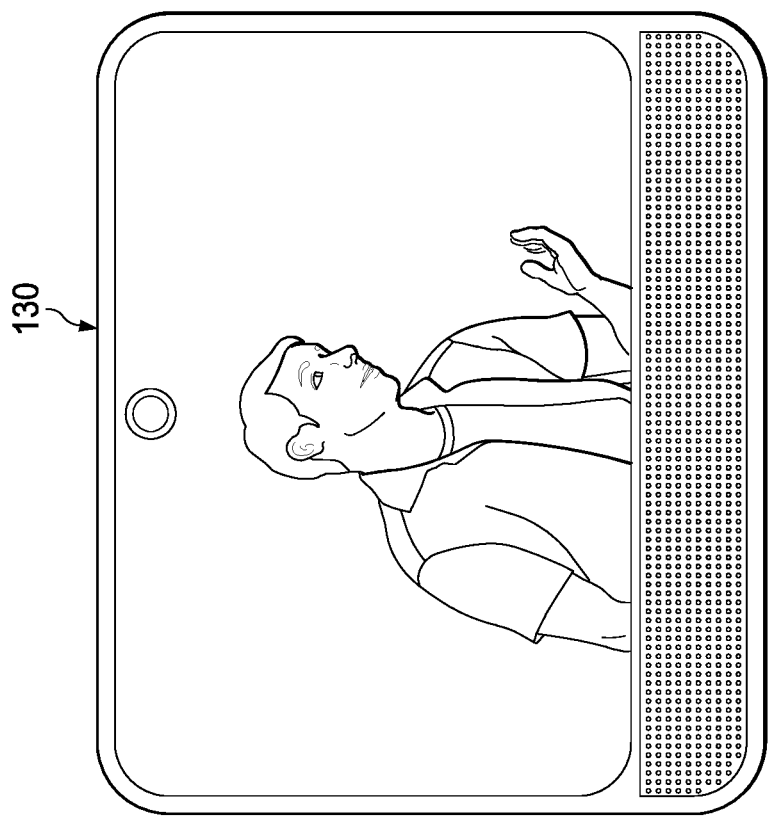
FIGS. 3A and 3B illustrate an example user interaction with an example intelligent communication device.
Figure 3A:
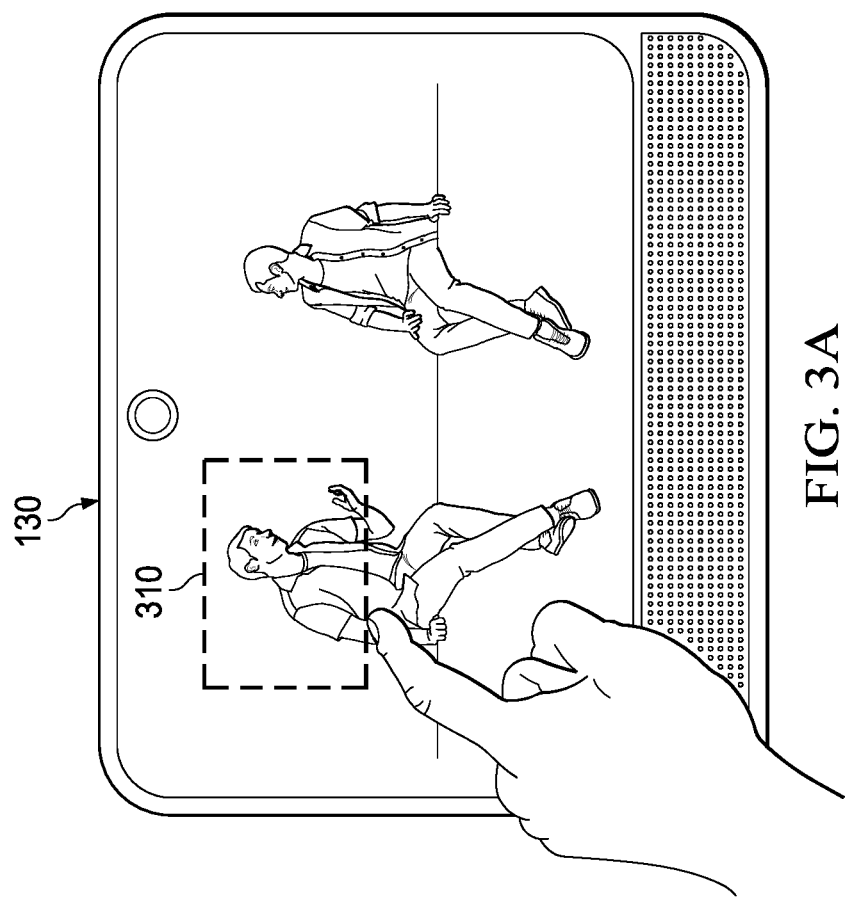

FIGS. 3A and 3B illustrate an example user interaction with an example intelligent communication device. In FIG. 3A, the intelligent communication device is displaying a scene in which two people who are talking to each other and to a user participant associated with intelligent communication device 130. The intelligent communication device 130 allows the user to interact with it in various ways, including tapping on a particular object or person on the display screen and zoom in on that person or object. As an example and not by way of limitation, the user may tap somewhere inside box 310 if the user desires to zoom in on the person inside box 310. FIG. 3B illustrates what may result from a user tapping on box 310. After the user taps inside box 310, the intelligent communication device 130 may digitally zoom in on the space inside box 310. In particular embodiments, if a first user has expressly specified that he or she allows a "following feature," a second user may tap on the screen of the device at a location corresponding to the first user, and the second user's tap may cause the intelligent communication device to follow the second user as he moves around the environment while still maintaining a tight, zoomed-in view of the second user. The first user's tap may also cause the audio coming from the person to be amplified relative to other noises in the environment, if the second user has expressly opted in to allowing his or her voice to be amplified relative to other sounds.

Figure 4:
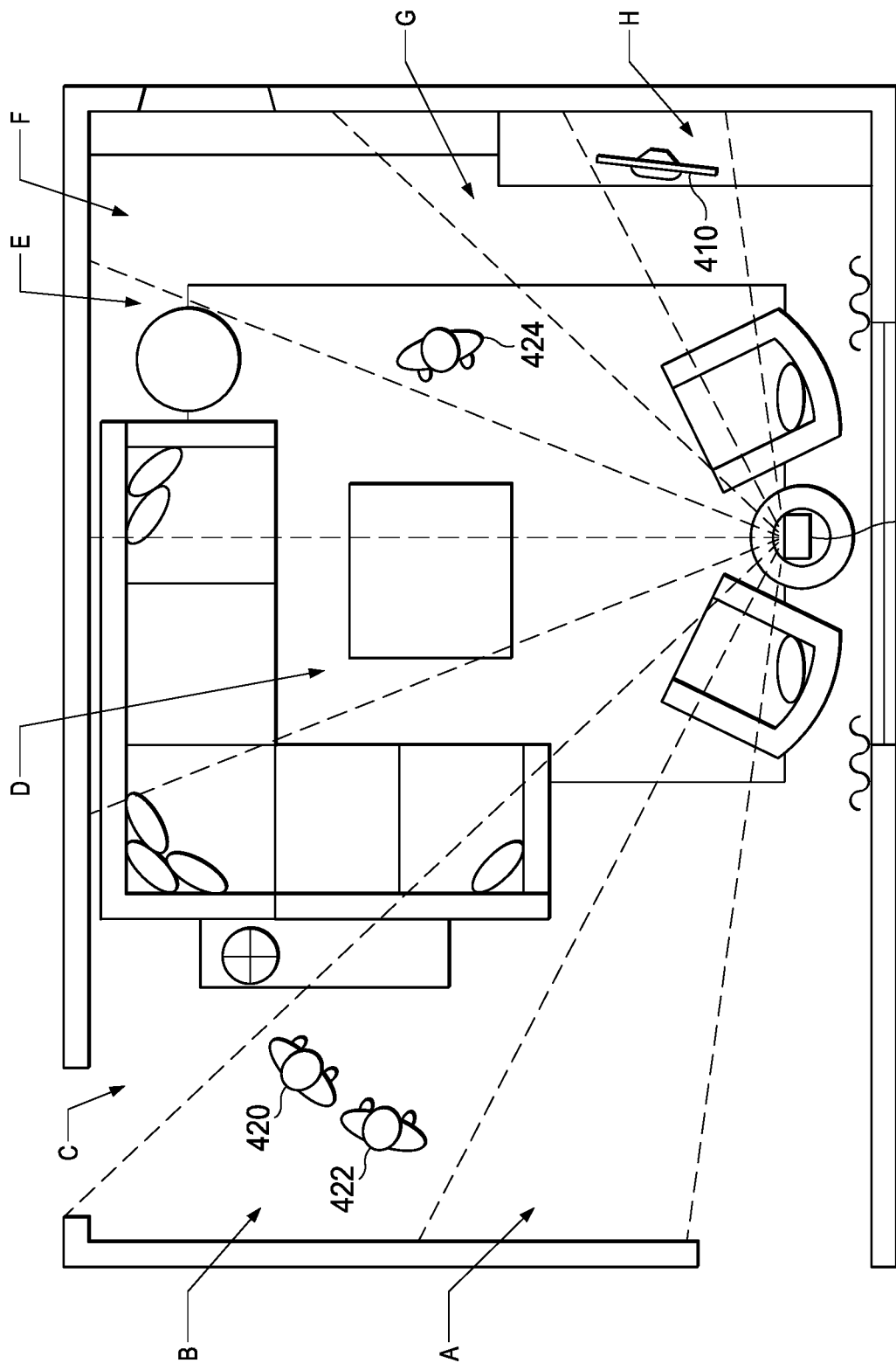
FIG. 4 illustrates an example visualization for visual and audio selection.

FIG. 4 illustrates an example visualization for visual and audio detection and/or selection for customization. In particular embodiments, the intelligent communication device 130 may divide its environment up into several "slices." In the example illustrated, there are eight slices A through H, but this disclosure contemplates any suitable number of slices. The smart audio component 131 may determine from which slice each audio source is coming. Likewise, the smart video component 133 may determine in which slice each visual object is located. As an example and not by way of limitation, persons 420 and 422 in sound slice B may be having a conversation with a third person 424 in slice F, and a television set 410 may be playing in sound slice H. Each of person 420, 422, and 424 and television 410 may be emitting sound simultaneously. The smart audio component 131 may identify all sound sources and determine in which slice they are currently located. Likewise, the smart video component 133 may identify all visual objects and determine in which slice they are currently located. In particular embodiments, a sound source or a visual object may occupy more than one slice. For example, a person may be straddling slices C and D. In this case, the smart audio component and smart video component may be able to determine that the sound and visual object (e.g., person) may be located at the edge of slice C and slice D. In the illustrated example, at least a portion of the face of each person 420, 422, and 424 may be visible by a camera of intelligent device 130. However, one or more of these persons may be oriented in such a way that they cannot be identified by device 130 using facial recognition technology. In at least some embodiments, each of these persons may be recognized by device 130 dependent on multimodal biometric characteristics associated with a unique identifier of the person in a descriptive model of the current AV communication session, and the device 130 may apply user-specific customizations to one or more of these persons.

Figure 5:
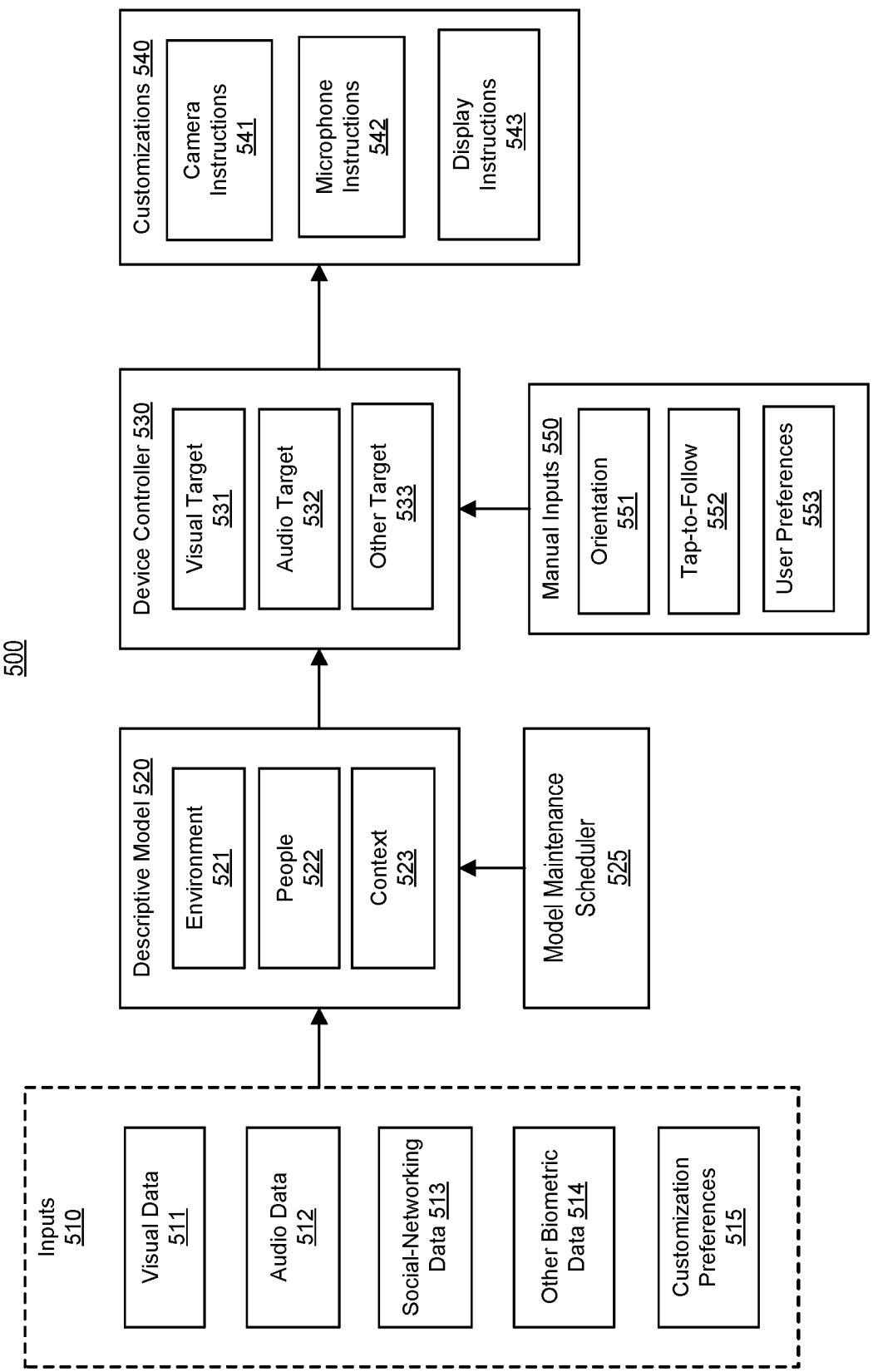
FIG. 5 illustrates an example block diagram including example inputs and customization decisions made by an example intelligent communication device.

FIG. 5 illustrates an example block diagram 500 including example inputs 510 and customization decisions made by an example intelligent communication device, such as intelligent communication device 130. In particular embodiments, the intelligent communication device 130 may access input data from one or more input sources. The input sources may include one or more cameras, one or more microphones, one or more biometric sensors other than a camera or microphone, one or more metadata elements (e.g., the number of participants in either the sending or receiving environment), one or more contextual elements associated with a current AV communication session, and/or customization preferences 515 for the device owner and/or one or more participants in the current AV communication session. The camera(s) may provide visual data 511, the microphone(s) may provide audio data 512, the contextual elements may come from the cameras, microphones, or social-networking data 513, other biometric data 514 may be obtained from one or more biometric sensors other than a camera or microphone, and the customization preferences 515 may be provided by the device owner and/or other participants in the current AV communication session during or prior to the session. In some embodiments, the device owner or another participant may access the device or the video or AR communication application settings to define or modify their customization preferences 515.

In various embodiments, customization preferences 515 may specify, for each person, one or more modifications to be applied to the appearance of that person or to an attribute of the voice of that person in a video stream output by the device, or modifications to a visual or audible attribute of a scene in which that person appears in a video stream output by the device. Examples of the user-specific customizations that may be applied by the device include, but are not limited to, raising the volume of a particular person who speaks softly using beamforming to boost the audio signal coming from their direction or otherwise enhancing the quality of the audio signal coming from their direction, applying an audio effect to the voice of a particular person (such as scrambling or otherwise disguising their voice, or causing their voice to sound like Darth Vader, Mickey Mouse, or a person who has inhaled helium), blurring the face of a particular person (e.g., a child) for privacy, adding artificial reality (AR) effects to a particular person's appearance (such as adding a hat or rabbit ears on their head, or adding a mask to their face), modifying the background against which a particular person is depicted, or editing a particular person out of the video output entirely using background replacement or any of various segmentation techniques. In another example, a user-specific customization to be applied to a particular person while that person is identified and tracked during the current AV communication session based on a transient characteristic of the person may include reacting more aggressively (e.g., when zooming in/out or panning) in response to a movement of the particular person if their activity level has been determined to be relatively high compared to that of others in the environment. In another example, a user-specific customization to be applied to a particular person may be based on a current contextual characteristic of the person, rather than being applied in all cases and under all circumstances in which that person is identified and tracked during the current AV communication session. For example, the particular modification applied may differ based on location, a date, day of the week, or time of day, a detected activity, the presence of others in the environment, etc., such as applying a first customization (e.g., a first modification to the appearance of a particular person) when they are cooking in the kitchen and a second customization (e.g., a modification to the voice of the particular person) when they are sitting on a couch in the living room on the weekend.

In particular embodiments, the visual data 511, the audio data 512, and the other biometric data 514 may be processed by one or more computing components on the intelligent communication device 130, such as smart audio component 131 and/or smart video component 133. In some embodiments, the visual data may include data representing a person's face, body size, body shape, pose, position, orientation, gait, movements, clothing, clothing color, hair color, eye color, skin tone, or other persistent or transient visual data associated with the person, a face detection result, a facial recognition result, or an output of a computer vision system. The device controller 530 may associate any or all of the raw or processed visual data 511 with a unique identifier of the person in a descriptive model 520 of the current AV communication session that maintains biometric characteristics associated with one or more persons detectable in the session for subsequent identification of the person and/or may consider any or all of this information when determining an appropriate user-specific customization to apply during the current AV communication session.

In particular embodiments, visual data 511 may include, for each person in the environment, a set of points that correspond to a plurality of surface points of the person. For example, the set of points may indicate the major body parts of the person. In one example, if the person has expressly opted in to 2D pose body tracing, the 2D pose data may provide a set of points that indicate where a person's body parts are located in the environment. If the person has expressly agreed to specific functionality in a privacy settings interface, the 2D pose data may be detailed enough to provide points about where the person's eyes, mouth, chin, and ears are located, which may be used to determine where the person is looking, or to provide an indication of an activity being performed by the person. In some embodiments, the 2D pose data may include a set of 19 x,y coordinate pairs collectively referred to as a "human skeleton", each representing one of the following body parts: top of head, chin, left ear, right ear, left eye, right eye, nose, left shoulder, right shoulder, left hip, right hip, left elbow, right elbow, left hand, right hand, left knee, right knee, left foot, and right foot. In addition to the set of points, the 2D pose data may also include a bounding box that encompasses the set of points. The bounding box may be large enough to contain all the points in the point set. In particular embodiments, one or more processors on the intelligent computing device 130 (or, alternatively of a remote server associated with an online social-networking system) may process the 2D pose data for use by the device controller. In particular embodiments, the data may be processed for background/foreground detection, for re-identification of persons who have moved out and then back into view, or for handing overlapping people. In particular embodiments, the data may be processed to determine a location of a particular person within the device's environment, or to determine an activity in which the person is engaged.

In particular embodiments, the audio data 512 may be processed by smart audio component 131. After being processed, the audio data 512 may include information about each sound source coming from the environment. This information may include (1) a direction from which the sound is coming relative to the intelligent communication device 130, and (2) a classification of the sound. For example, audio data 512 may represent a voice detection result, a voice recognition result, or a beamforming signal indicative of the direction from which an audio signal is received (i.e., spatial information). As an example and not by way of limitation, a television set may be presenting a basketball game. The smart audio component 131 may identify a sound source, classify it as television audio, and determine that it is coming from 25 degrees to the left of the intelligent communication device 130. The smart audio component 131 may then provide this information as audio data 512 to device controller 530. Similarly, the smart audio component 131 may identify a sound source, classify it as human speech, and determine that it is coming from 15 degrees to the right of the intelligent communication device 130. The audio component 131 may process the audio signal classified as human speech to detect a speech pattern, to determine the content of the person's speech, or to apply voice recognition technology, among other options. The device controller 530 may associate any or all of the raw or processed audio data 512 with the unique identifier of the person in the descriptive model 520 of the current AV communication session for subsequent identification of the person and/or may consider any or all of this information when determining an appropriate user-specific customization to apply during the current AV communication session.

In particular embodiments, other biometric data 514 may be processed by intelligent device 130. For example, the biometric data 514 may represent a signal received from a depth sensor, a signal received from a 3D scanner, a signal received from a fingerprint scanner (e.g., on a remote control for the intelligent communication device), or a signal received from a geolocation device, among other possibilities. After being processed, the biometric data 514 may include additional persistent, transient, or contextual information associated with a person in the device's environment. The device controller 530 may associate any or all of the raw or processed biometric data 514 with the unique identifier of the person in the descriptive model 520 of the current AV communication session for subsequent identification of the person and/or may consider any or all of this information when determining an appropriate user-specific customization to apply during the current AV communication session.

In particular embodiments, a computing component of the intelligent communication device 130 or a remote computing device associated with a social-networking system may generate the current descriptive model 520 based on the input data. The current descriptive model 520 may, subject to privacy settings of the device owner and/or each of the relevant users, include identifying or non-identifying descriptive characteristics (e.g., descriptive elements) about (1) the environment, shown as elements 521, (2) people within the environment, shown as elements 522, and (3) the context of the current AV communication session, shown as elements 523. The description of the environment in which the intelligent communication device is currently located may be important for the device controller 530 because the device controller 530 may use the information to make customization decisions during the AV communication session. As described in more detail below, in particular embodiments, model maintenance scheduler 525 may determine when and whether to request updated information about the people participating in the current AV communication session from a camera, microphone, or other biometric sensor associated with device 130 in a manner that makes efficient use of device resources.

Generally, the intelligent communication device 130 does not store information gathered during a given AV communication session for use in future AV communication sessions or for any other purpose. This may serve to protect the participants' privacy and personal information. For example, in particular embodiments, the information stored in the descriptive model 520 for a current AV communication session may be erased or cleared after that AV communication session has ended. In such embodiments, the device does not store information about detected persons from one AV communication session to the next. In some embodiments, subject to privacy settings of the device owner and/or each of the relevant users, a person's identity might not be determined nor recorded, even temporarily. In other embodiments, subject to privacy settings of the device owner and/or each of the relevant users, at least some of the information stored in the current descriptive model may be maintained across multiple AV communication sessions. For example, in particular embodiments, a user or group of users may wish to have their information stored locally on the device 130 and used during future AV communication sessions. Storing information for future use may save computing resources and also provide an enhanced user experience. Such data is not sent to any remote device but is only stored locally on the device 130. In particular embodiments, the device 130 may generate a historical descriptive model that is based on past AV communication sessions that have occurred within the environment. The device controller 530 may access the historical descriptive model when it makes customization decisions. For example, if allowed in accordance with per user privacy settings, persistent characteristics such as reference audio data usable for voice recognition or reference image data usable for facial recognition may be maintained across AV communication sessions for the device owner and/or specified others, such as immediate family members or housemates. However, transient characteristics and current contextual characteristics associated with all detected persons, along with reference audio or image data associated persons other than the device owner and any specified others, may be erased or cleared between AV communication sessions.

In various embodiments, methods for identifying and tracking a particular person within the device's environment may be dependent on a person's location or orientation within the device's environment. In one example, when the person is located far away from, or facing away from, the intelligent communication device 130 but is still detectable in the environment, the intelligent communication device 130 may still be able to recognize and track the person within the environment based on biometric characteristics other than a facial recognition result. In this example, if a facial recognition result (i.e., a first biometric characteristic)

was associated with a unique identifier of the particular person when they were first detected by a camera of the device and one or more other biometric characteristics of the person (e.g., a voice recognition result, a location within the environment, clothing, posture, gait, and/or another biometric characteristic including, but not limited to, those described herein) were detected and associated with that user identifier while the person's face was still in view of the camera and identifiable using facial recognition, any user-specific customizations that were applied based on the original facial recognition result may continue to be applied after the person turns away from the device or moves to a location at which facial recognition is not possible based on detection of one or more of the other biometric characteristics associated with the user identifier.

In particular embodiments, the device controller 530 may use the information in the current descriptive model to identify one or more visual targets 531, one or more audio targets 532, and/or one or more other targets 533 to which user-specific customizations should be applied. Visual targets 531 may include any person or object for which a user-specific modification based on multimodal biometric characteristics should be applied to its appearance. As examples and not by way of limitation, when a particular person is identified as a visual target for customization, the modification may include adding artificial reality (AR) effects to a particular person's appearance (such as adding a hat or rabbit ears on their head or adding a mask to their face). As further examples and not by way of limitation, when the environment around the device or around a particular person is identified as a visual target for customization, the modification may include modifying the background against which a particular person is depicted, or editing a particular person out of the video output entirely using background replacement or any of various segmentation techniques. Audio targets 532 may include any audio source for which a user-specific modification based on multimodal biometric characteristics. As examples and not by way of limitation, when a particular audio source is identified as an audio target for customization, the modification may include raising the volume of a particular person who speaks softly or otherwise enhancing the quality of the audio signal coming from their direction, applying an audio effect to the voice of a particular person (such as scrambling or otherwise disguising their voice, or causing a particular person's voice to sound like Darth Vader, Mickey Mouse, or a person who has inhaled helium. Other targets 533 may include a type of output of the intelligent communication device 130 other than the audio or video associated with a live video stream of an AV communication session for which a user-specific modification based on multimodal biometric characteristics should be applied. As examples and not by way of limitation, when another type of target is identified as an audio target for customization, the modification may include a change in the number, frequency, or content of advertisements presented alongside the live video stream, a change to the elements of a menu presented alongside the live video stream, or the layout of visual elements concurrently presented by the intelligent communication device 130, including the live video stream and any elements representing additional functionality, such as a clock, a menu, a weather-report element, or an advertisement.

In particular embodiments, the device controller 530 may make customization decisions based on one or more manual inputs 550 entered by the device owner or another participant in the current AV communication session, e.g., through a graphical user interface of the intelligent communication device 130. In particular embodiments, manual inputs entered by participants may override decisions made by the device controller 530. For example, the inputs a participant may enter into the system may include the orientation of the display screen of the intelligent communication device 130 (e.g., portrait or landscape), a tap-to-follow command, and various other user preferences. Based on the orientation of the display screen, the device controller 530 may make different customization decisions. For example, a user-specific customization applied to the background in which a particular person appears when the display screen is oriented in landscape mode may be different than the customization applied when the display screen is oriented in portrait mode. In another example, the default mode for the intelligent communication device 130 may be a group viewing mode, where most of the subjects are within the viewing space of the display screen. However, as described above in reference to FIGS. 3A and 3B, if a participant taps on a particular subject, the display screen may zoom in on that subject so that the participant sees a close-up of the subject, given that the subject has previously opted in to this feature. User preferences 553 may be used by a participant to set various privacy preferences. For example, a participant may specify that the intelligent communication device 130 never send visual data of the participant's bathroom (which may be visible by the intelligent communication device 130). As another example, a participant may specify that they are never identified using their social-networking data or by any other means or may elect to block the social-networking system interface 135 from accessing information related to the user. As yet another example, a participant may enter or select customizations to be applied when they are identified and tracked in an AV communication session, either in all cases or dependent on a current contextual characteristic of the AV communication session. In various embodiments, customizations may be selected and applied during a current AV communication session or may be applied during a current AV communication session based on saved settings for the device and/or the video or AR communication application by, or on behalf of, the device owner or another participant.

Once the device controller 530 has determined, based at least on information in the descriptive model 520, it may generate customizations 540, including camera instructions 541, microphone instructions 542, and other display instructions 543 and may provide those to intelligent communication device 130 for applying the customizations. The camera instructions may be any suitable instructions for a camera, such as instructions to zoom in on a subject, zoom out, pan, center the camera at a particular location, react incrementally or aggressively in response to the movement of a particular person, apply a camera effect such as a filter to blur or change the color of all or a portion of the captured images, or any other suitable action. The microphone instructions may be any suitable microphone instructions, including instructions to dampen a particular sound relative to other sounds, amplify a particular sound relative to other sounds, apply an equalization technique to enhance the quality of a particular user's voice, apply a voice effect to a particular user's voice, or any other suitable instruction. Display instructions 543 may include instructions for adding artificial reality effects to a particular person's appearance, modifying the background against which a particular person is depicted, editing a particular person out of the video output entirely, modifying display elements other than the live video stream of the current AV communication session, or any other suitable instruction.

Figure 6:
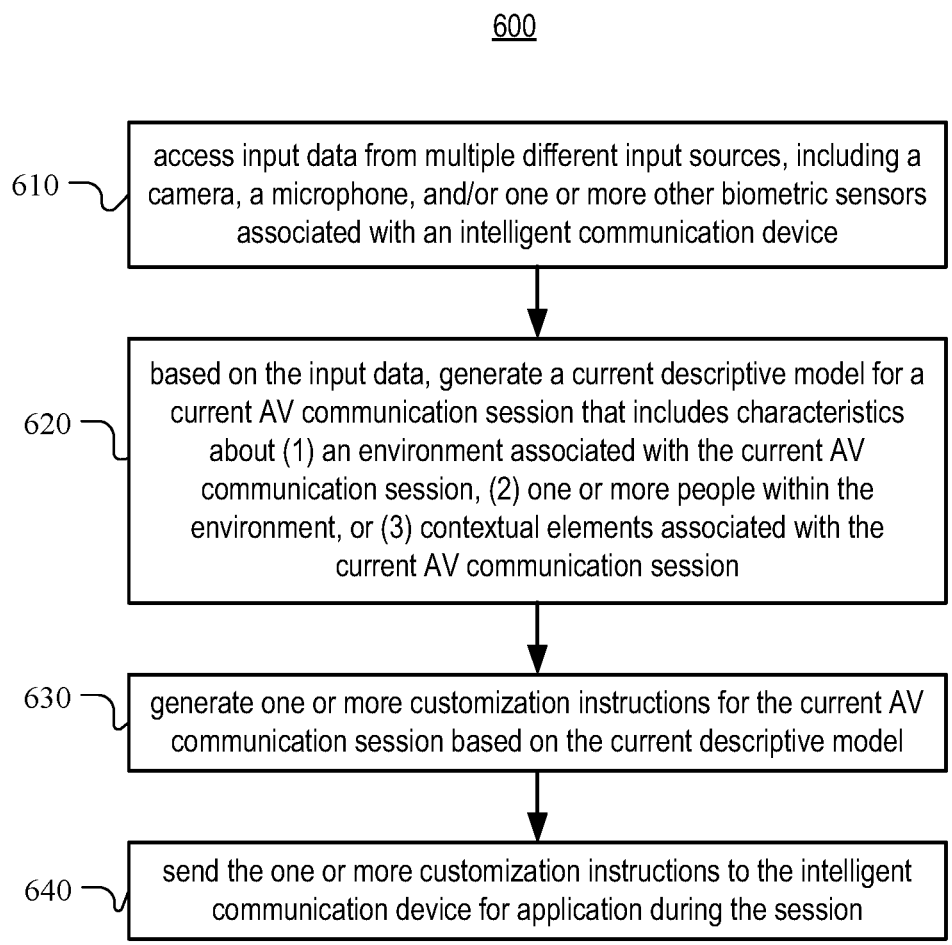
FIG. 6 illustrates an example method for making customization decisions based on a descriptive model of an environment.

FIG. 6 illustrates an example method 600 for making customization decisions based on a descriptive model of an environment. The method may begin at step 610, where a computing device may access input data from multiple different input sources, including a camera, a microphone, and/or one or more other biometric sensors. In some embodiments, the computing device may be an intelligent communication device, such as intelligent communication device 130, having a touch sensitive display screen, speakers, one or more cameras, which may include a camera having a lens with a wide field of view, and one or more microphones, which may include a phased microphone for directional audio, such that the device can determine from where, within its environment, sound is coming. The intelligent communication device may also include, or be communicably coupled to, one or more other biometric sensors from which biometric characteristics of persons detectable by the device may be obtained such as, for example and not by way of limitation, a depth sensor, a 3D scanner, a fingerprint scanner (e.g., on a remote control for the intelligent communication device), or a geolocation device, among other possibilities. In particular embodiments, the strength of a Wi-fi or Bluetooth signal received by the intelligent communication device may be used to determine whether and where a person is located within the environment of the device based on their interference with the signal. As described in detail herein, the intelligent communication device may include internal processing capability that enables it to apply user-specific audio/visual customizations using multimodal biometric characterization.

At step 620, the computing device may, based on the input data, generate a current descriptive model for a current AV communication session that includes characteristics about (1) an environment associated with the current AV communication session, (2) one or more people within the environment, or (3) contextual elements associated with the current AV communication session. At step 630, the computing device may generate one or more customization instructions for the current AV communication session based, at least in part, on the current descriptive model, as described herein. At step 640, the computing device may send the one or more customization instructions to the intelligent communication device for application during the session.

In particular embodiments, an intelligent communication device, such as intelligent communication device 130, may applying customizations during a current AV communication session based on identifying and tracking users across space and time. Per-user customizations can be applied based on multimodal biometric signals that identify particular users with higher confidence than is possible using only a single biometric signal, such as a facial recognition result, alone. Once a particular person is identified, they may be tracked as they move into and around a scene depicted in a video stream output by the device over time based on a unique identifier associated with the person. At various times during the AV communication session, different ones or combinations of the multimodal biometric signals associated with the particular person may be detectable in data obtained from a camera, microphone, or other biometric sensor of, or communicably coupled to, the device. At any given time, various ones or combinations of the multimodal biometric signals associated with the particular person might not be detectable by the device, depending on the location, position, or orientation of the person, how far away the person is from the device, whether anything else in the environment is blocking a video or audio signal that would otherwise include detectable information about the particular person, current lighting conditions in the vicinity of the particular person, or other current conditions in the environment. However, the user-specific customizations may be applied when any one or more of the multimodal biometric signals associated with the particular person are discernable even if not all of the multimodal biometric signals associated with the particular person are detectable at that time.

In various embodiments, the multimodal biometric signals may include, for example, a face detection result, a facial recognition result, a voice detection result, a voice recognition result, a beamforming signal indicative of the direction from which an audio signal is received, a signal received from a depth sensor, a signal received from a 3D scanner, a signal received from a fingerprint scanner, a signal received from geolocation device, or an output of a computer vision system, among other possibilities. For example, an output of computer vision processing (which may be performed on a single frame basis or a multiple frame basis) may include data representing a face detection result, a pose detection result, a head detection result, a gait detection result, a gesture detection result, a movement detection result, and/or another biometric characteristic detectable in video data captured by the camera including, but not limited to, those described herein. In another example, the output of an analysis of audio captured by one or more microphones may include an audio direction and an amplitude from which a location and classification, as well as a voice recognition result or speech pattern, may be determined for each detected audio source. Once two or more of these signals are associated with a particular user, any one or more of them may be used to identify the user in a scene, regardless of whether other biometric signals associated with the user are discernable. Typical behaviors of a particular user, such as a typical gait, pose, gesture, or movement, whether observed either generally or only in certain locations or contexts, may be learned based on any number or combination of the multimodal biometric signals associated with their unique user identifier.

Any number of biometric signals may be associated with a unique identifier for a particular user in a data structure representing descriptive model of a current AV communication session between two or more users that maintains up-to-date information about various people in the environment, such as those detectable by the device through the camera or other sensors. As described below in reference to FIG. 8, a passive scheduler may determine when and how often to update the multimodal biometric information associated with each user and may schedule biometric readings accordingly to ensure efficient use of system resources for updates to the world model.

Tracking and identifying users spatially and temporally based on multimodal biometric signals may allow the device to provide customized experiences to individual users based on who they are, where they are within the environment of the intelligent communication device, what they are doing, and/or other contextual information discernable from the multimodal biometric signals. User-specific customizations may be applied in all cases or only in certain contexts. Unlike with traditional tracking methods used by video conferencing devices, which only track users frame-by-frame as they pop in and out of a scene depicted in the video output, and without any knowledge of their identity, the intelligent communication devices described herein may track and identify users across space and time to provide customized experiences to individual users within audio/ visual communication sessions or in conjunction with AR/VR features, smart assistant features, or other applications.

Figure 7:
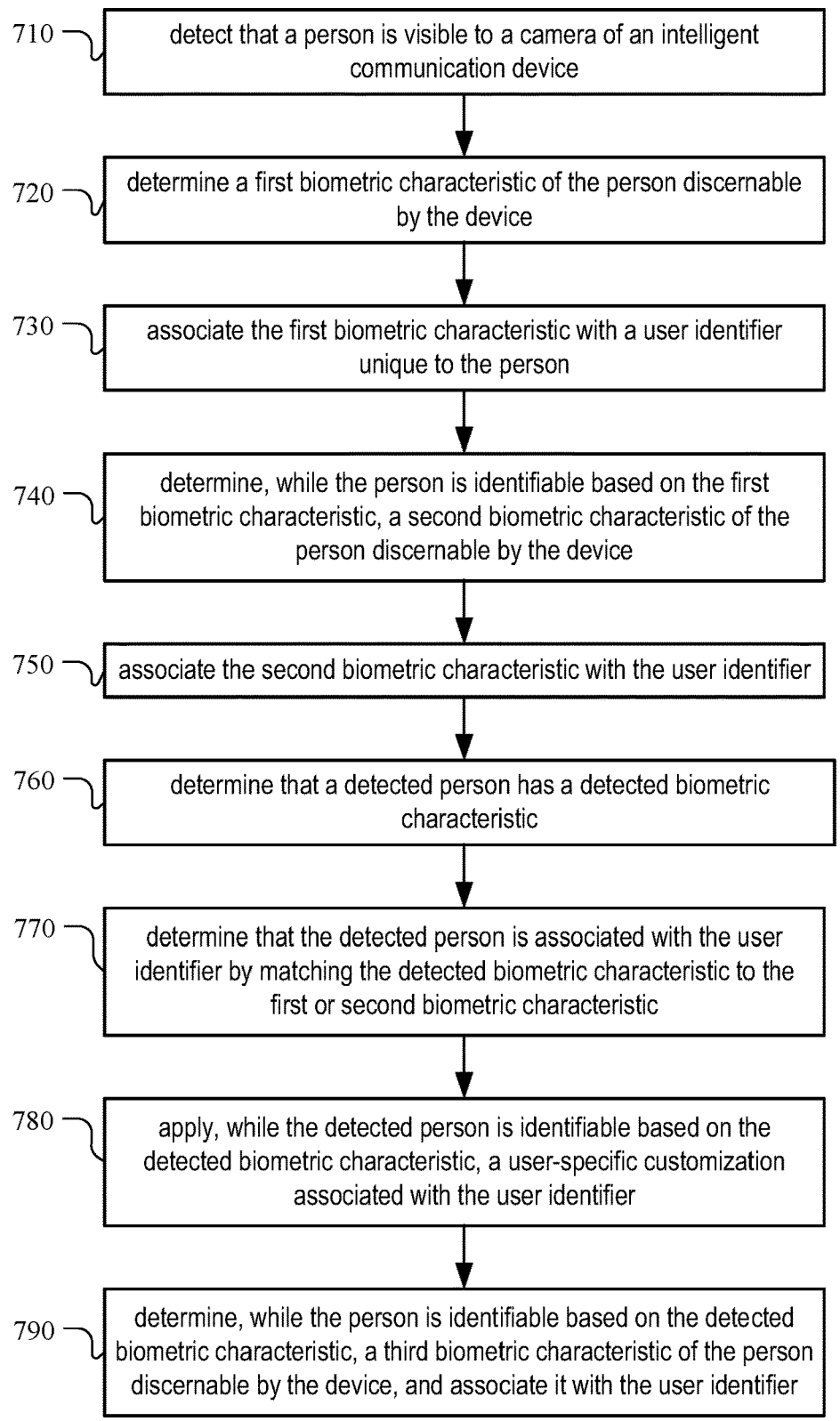
FIG. 7 illustrates an example method for applying user-specific customizations in audio/visual communication sessions based on multimodal biometric characteristics of detected users.

FIG. 7 illustrates an example method 700 for applying user-specific customizations in audio/visual communication sessions based on multimodal biometric characteristics of detected users. The method may begin at step 710, where a computing device may detect that a person is visible to a camera of the device. In some embodiments, the computing device may be an intelligent communication device, such as intelligent communication device 130, having a touch sensitive display screen, speakers, one or more cameras, which may include a camera having a lens with a wide field of view, and one or more microphones, which may include a phased microphone for directional audio, such that the device can determine from where, within its environment, sound is coming. The intelligent communication device may also include, or be communicably coupled to, one or more other biometric sensors from which biometric characteristics of persons detectable by the device may be obtained such as, for example and not by way of limitation, a depth sensor, a 3D scanner, a fingerprint scanner (e.g., on a remote control for the intelligent communication device), or a geolocation device, among other possibilities. In particular embodiments, the strength of a Wi-fi or Bluetooth signal received by the intelligent communication device may be used to determine whether and where a person is located within the environment of the device based on their interference with the signal. As described in detail herein, the intelligent communication device may include internal processing capability that enables it to apply user-specific audio/visual customizations using multimodal biometric characterization.

At step 720, the computing device may determine a first biometric characteristic of the person discernable by the device. In certain embodiments, the first biometric characteristic may represent a facial recognition result identifying the detected person. In some embodiments, the first biometric characteristic may represent a persistent attribute of the detected person discernable in video or audio data captured by the camera or in data received from a biometric sensor of the device other than the camera, such as a facial recognition result, a voice recognition result, a voice classification result, or data representing a person's face, body size, body shape, hair color, eye color, or skin tone, for example. In some embodiments, the first biometric characteristic may represent a learned behavior of the detected person discernable in video or audio data captured by the camera or in data received from a biometric sensor of the device other than the camera, such as a typical pose, gait, gesture, movement, or speech pattern. In some embodiments, the first biometric characteristic may represent a transient attribute of the detected person discernable in video or audio data captured by the camera or in data received from a biometric sensor of the device other than the camera, such as a current pose, an article of clothing currently being worn, one or more clothing colors, a current activity level, a current location, direction, distance, position, or orientation with respect to the computing device, a current gesture or movement, or the current content of the person's speech. For example, the computing device may determine that the detected person is wearing a green shirt, is standing still, and that their current precise location within the environment relative to the device is 10 ft away and 10 degrees to the left of the device. In some embodiments, the first biometric characteristic may represent a current contextual attribute of the detected person discernable in video or audio data captured by the camera or in data received from a biometric sensor of the device other than the camera, such as the location of the device, an activity being performed by the detected person, the presence of other persons in the environment, a location of the detected person relative to other persons or objects in the environment, a date, a day of the week, or a time of day, for example. In particular embodiments, the device may detect and learn patterns in combinations of biometric characteristics associated with a particular person and may subsequently identify the person based on those learned patterns and apply user-specific customizations accordingly. For example, the device may learn that the person wears certain clothing (e.g., a work or team uniform) on particular days of the week, that the person typically sits at a table (e.g., drinking coffee or eating a meal) at particular times of day, or that the person moves to the front door (e.g., to go to work) at a particular time on particular days.

At step 730, the computing device may associate the first biometric characteristic with a user identifier that is unique to the person and that is persistent for at least the duration of the current AV communication session. For example, the first biometric characteristic may be associated with a unique user identifier assigned to the detected person in response to detecting and identifying the person in a data structure representing a descriptive model of the current AV communication session. The model may store information representing one or more persons detectable by the device, including the detected person, as well as biometric characteristics associated with each of the detected persons.

At step 740, the method may include, while the detected person is identifiable based on the first biometric characteristic, the computing device determining a second biometric characteristic of the person discernable by the device. The second biometric characteristic may represent a persistent, transient, or current contextual attribute of the detected person discernable in video or audio data captured by the camera or in data received from a biometric sensor of the device other than the camera, such as any of the attributes described above in reference to the first biometric characteristic at step 730, or any other suitable biometric characteristic.

At step 750, the computing device may associate the second biometric characteristic with the user identifier. For example, the second biometric characteristic may be associated with the unique user identifier assigned to the detected person in the data structure representing the descriptive model of the current AV communication session.

At step 760, after having associated the first and second biometric characterizations with the unique user identifier assigned to the person detected at step 710, the method may include the computing device determining that a currently detected person has a detected biometric characteristic. For example, at a later point in time during the current AV communication session, the computing device may detect a person in the environment and determine one or more biometric characteristics of the detected person. In particular embodiments, if the currently detected person is positioned in the environment such that they are not facing the device, or that it is otherwise not possible to identify the currently detected person using facial recognition technology, the device may be able to another biometric characteristic of the currently detected person, such as a voice recognition result, a speech pattern, a gait, or the color of their clothes, for example.

At step 770, the computing device may determine that the person detected at step 760 is associated with the unique user identifier assigned to the person detected at step 710 (i.e., that it is the same person) by matching the detected biometric characteristic to the first or second biometric characteristic. The computing device may identify the detected person with a given degree of confidence when the detected person is identified based on at least one of the first biometric characteristic or the second biometric characteristic. The given degree of confidence may be higher when both the first and second biometric characteristics of the detected person are discernable by the device than when only one of the first biometric characteristic or the second biometric characteristic is discernable by the device. In particular embodiments, the computing device may recognize the detected person based in part on their location if the person has turned away from the device based on two or more discernable biometric characteristics associated with the person including their location. In particular embodiments, the computing device may recognize the detected person based on one or more biometric characteristics associated with the person and stored in associated with the user identifier of the person even after they leave and subsequently reenter the device's environment during the same AV communication session as long as, upon reentry, they are positioned within the environment and/or oriented with respect to the device in a way that allows the device to discern the one or more biometric characteristics.

At step 780, the computing device may, while the person detected at step 760 is identifiable based on the detected biometric characteristic, apply a user-specific customization associated with the user identifier. In embodiments in which detected biometric characteristic is a transient attribute of the detected person, the user-specific customization may be dependent on the transient attribute. In embodiments in which detected biometric characteristic is a current contextual attribute of the detected person, the user-specific customization may be dependent on the current contextual attribute. In particular embodiments, the user-specific customization may be dependent on the location of the detected person or the computing device. For example, a different user-specific customization may be applied when the detected person (and the computing device) are located at the detected person's home than when the detected person (and the computing device) are not at the detected person's home. In particular embodiments, the user-specific customization may be dependent on an activity being performed by the detected person and may also be dependent on their location. For example, a first user-specific customization may be applied when the detected person is cooking in their kitchen and a second user-specific customization may be applied when the detected person is sitting in their living room. As described herein, applying the user-specific customization may include modifying the appearance of the detected person or an attribute of the voice of the detected person in a video stream output by the device, or modifying a visual or audible attribute of a scene in which the detected person appears in a video stream output by the device, among other possibilities.

At step 790, the method may include, while the person detected at step 760 is identifiable based on the detected biometric characteristic, the computing device determining a third biometric characteristic of the person discernable by the device and associating the third biometric characteristic with the user identifier. In some embodiments, method 700 may also include, subsequent to associating the third biometric characteristic with the user identifier, identifying the detected person based at least on the third biometric characteristic with a given degree of confidence. In this example, the given degree of confidence may be higher when at least one of the first biometric characteristic or the second biometric characteristic of the detected person is also discernable by the device than when only the third biometric characteristic is discernable by the device (not shown in FIG. 7). In general, any number of additional biometric characteristics may be determined and associated with a particular user identifier to improve the descriptive model of the current AV communication session. Adding biometric characteristics to the model in association with the user identifier may increase confidence in any subsequent identification of the particular user using various ones or combinations of the biometric characteristics associated with the particular user's unique identifier and may allow the computing device to continue to apply appropriate user-specific customizations as the particular user moves into, out of, and around within the environment of the device.

As described above, a descriptive model of a current AV communication session may be generated based on signals and other inputs obtained from cameras, microphones, and other biometric sensors. The application of computer vision technology, image processing, audio processing, and other analysis techniques may be applied to analyze the inputs and determine particular biometric characteristics of each person detected in the current AV communication session. The model may maintain any or all of this information in association with each detected person. In other words, the model may represent a history of all the persons detected in the device's environment during the session based on temporal and spatial locality. It may be a goal of the intelligent communication device 130 to keep the model up to date so that, among other things, user-specific customizations are applied correctly. Updating the model may include sending requests for current biometric data to the cameras, microphones, and other biometric sensors on a periodic or other recurring basis. In particular embodiments, there may be a default value for the time delay between update requests. Generating and updating the model are performed on the intelligent communication device itself.

In particular embodiments, it may be desirable to use the local computing resources as efficiently as possible. To that end, a passive scheduling process may be used to determine when, how often, and/or whether to update the biometric characteristics associated with each of the persons detected in the device's environment during a current AV communication session while conserving local computing resources as much as possible. The passive scheduling process may implement a loop that generates requests for updates to the model but does not waste resources trying to update all of the information for every detected person on each iteration. Instead, the passive scheduling process may focus on particular persons and/or particular biometric characteristics of those persons, ranking, filtering, and otherwise prioritizing the list of persons whose updated information is requested at particular points in time. In particular embodiments, a higher update priority may be assigned to persons for whom a request for updated information is most likely to succeed. In one example, if a particular person is standing in a dark portion of the environment, the likelihood that a request for biometric characteristics based on visual data, such as a facial recognition result, will be successful may be relatively low compared to the likelihood of success for a similar request directed to a person standing in a well-lit portion of the environment. In another example, if a particular person is standing far away from the device, the likelihood that a request for biometric characteristics based on audio data, such as a voice recognition result or a detected speech pattern, will be successful may be relatively low compared to the likelihood of success for a similar request directed to a person standing close to the device.

In particular embodiments, a higher update priority may be assigned to persons for whom two or more biometric characteristics that are persistent for at least the duration of a current AV communication session have already been determined and stored in the model than to persons for whom only a single biometric characteristic has been determined and stored in the model. Therefore, the device might not request additional biometric characteristics for persons for whom multiple persistent biometrics are available in the model absent a change associated with the person that is identifiable by the device, such as if they move into or out of range of the device or its sensors. In particular embodiments, requests to obtain biometric characteristics associated with a particular person may be scheduled based on how recently updated information was requested and/or on the likelihood that updated information can be successfully obtained. In one example, repeated requests for biometric characteristics may at first be made using a default time interval (e.g., after 1 second) but, if unsuccessful, the interval between requests may be incrementally increased (e.g., to 2 seconds, then 4 seconds, and so on) to conserve local computing resources, given that the requests are unlikely to succeed. In particular embodiments, after each time the model is updated, the following steps may be performed: (1) determining, one or more persons detected in the current AV communication session, (i.e., targets) about which to request information and the biometric characteristic to obtain, which may include determining whether a minimum delay has elapsed since the last request associated with each person, whether the person is within range of the camera, microphone, or other applicable sensor, and whether the baseline data for performing the desired biometric analysis can be obtained (i.e., the likelihood of success) and (2) ranking the possible targets based on the last time a request was made, whether the most recent request was successful or failed, whether the local computing resources required to obtain the requested information are available, and/or any other suitable criteria.

Figure 8:
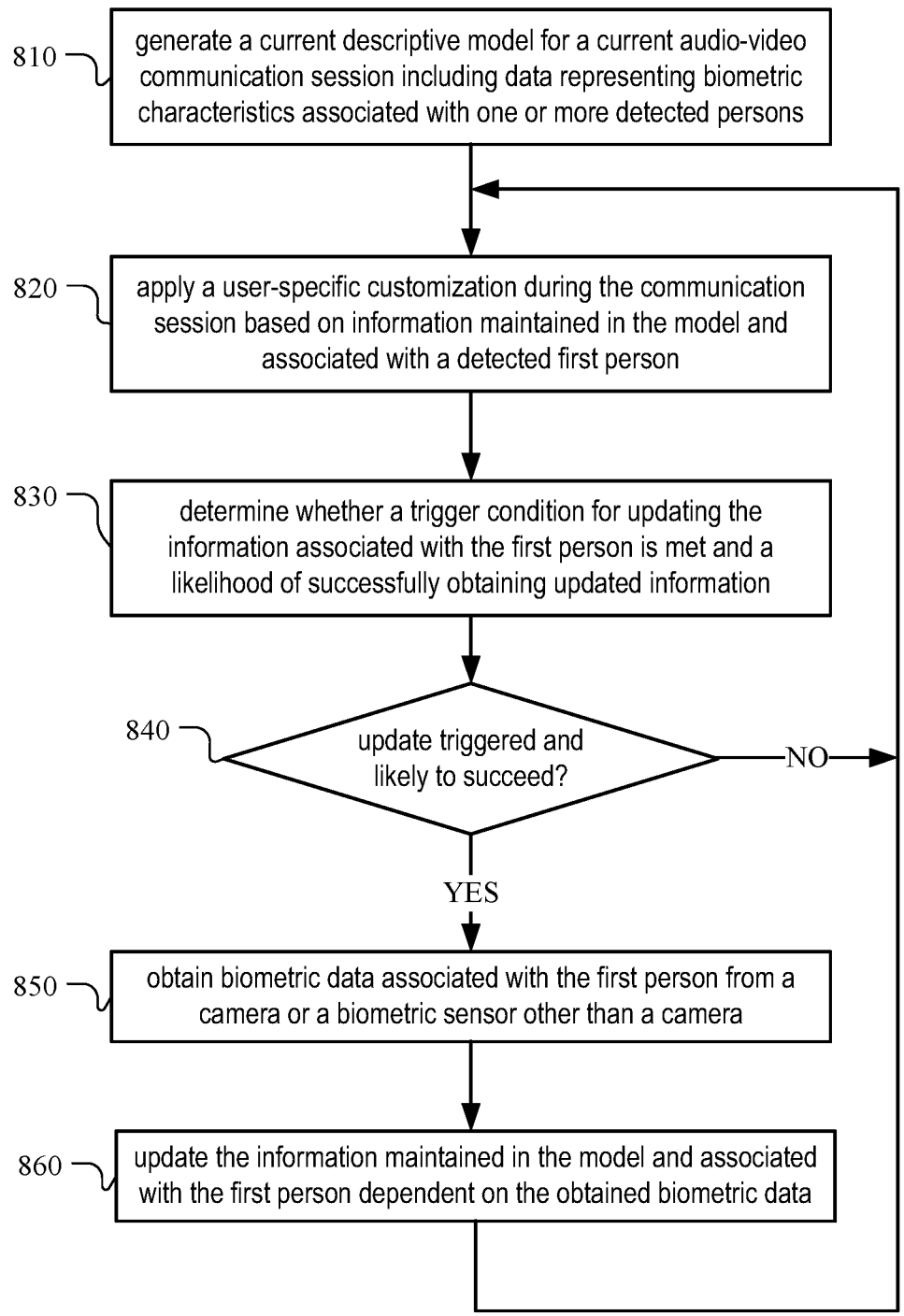
FIG. 8 illustrates an example method for generating and scheduling updates to a descriptive model of an audio/visual conferencing environment.

FIG. 8 illustrates an example method 800 for generating and scheduling updates to a descriptive model of an audio/visual conferencing environment. In particular embodiments, some of the operations of method 800 may be performed by a passive scheduler, such as scheduler 245 or scheduler 525. The method may begin at step 810, where a computing device, such as intelligent communication device 130, may generate a current descriptive model for a current AV communication session including data representing biometric characteristics associated with one or more detected persons, as described above in reference to FIG. 6. Generating the descriptive model may include storing biometric characteristics associated with one or more persons detectable by the computing device in association with respective user identifiers in a data structure representing the model. At step 820, the computing device may apply a user-specific customization during the AV communication session based on information maintained in the model and associated with a detected first person, as described above in reference to FIG. 7.

At step 830, the computing device, or a passive scheduler thereof, may determine whether a trigger condition for updating the information associated with the first person is met and a likelihood of successfully obtaining updated information. As described above, the trigger condition may include an elapsed default or user-specific minimum time interval between requests for information, and the likelihood of success may be determined based on whether the first person is within range of the camera, microphone, or other applicable sensor, whether the most recent request for biometric characteristics associated with the first person was successful or failed, and/or whether the local computing resources required to obtain the requested information are available. If, at step 840, the computing device or scheduler determines that a trigger condition for updating the information associated with the first person has been met and that it is likely to succeed, method 800 may continue at step 850. Otherwise, method 800 may return to step 820.

At step 850, the computing device may obtain biometric data associated with the first person from a camera, a microphone, a biometric sensor of the device other than a camera or microphone, or a biometric sensor that is communicably coupled to the device. In some embodiments, this may include, in response to determining that the trigger condition has been met and that that the request is likely to succeed, the computing device or scheduler requesting current biometric data from the camera, microphone, or other biometric sensor, or scheduling such a request. In particular embodiments, scheduling the request may include calling a biometrics service with the request, such as with a request directed to a camera or microphone for facial or voice recognition of the first person or with a request directed to another biometric sensor to obtain another type of biometric characteristic associated with the first person.

At step 860, the computing device may update the information maintained in the model and associated with the first person dependent on the obtained biometric data, after which method 800 may return to step 820.

Figure 9:
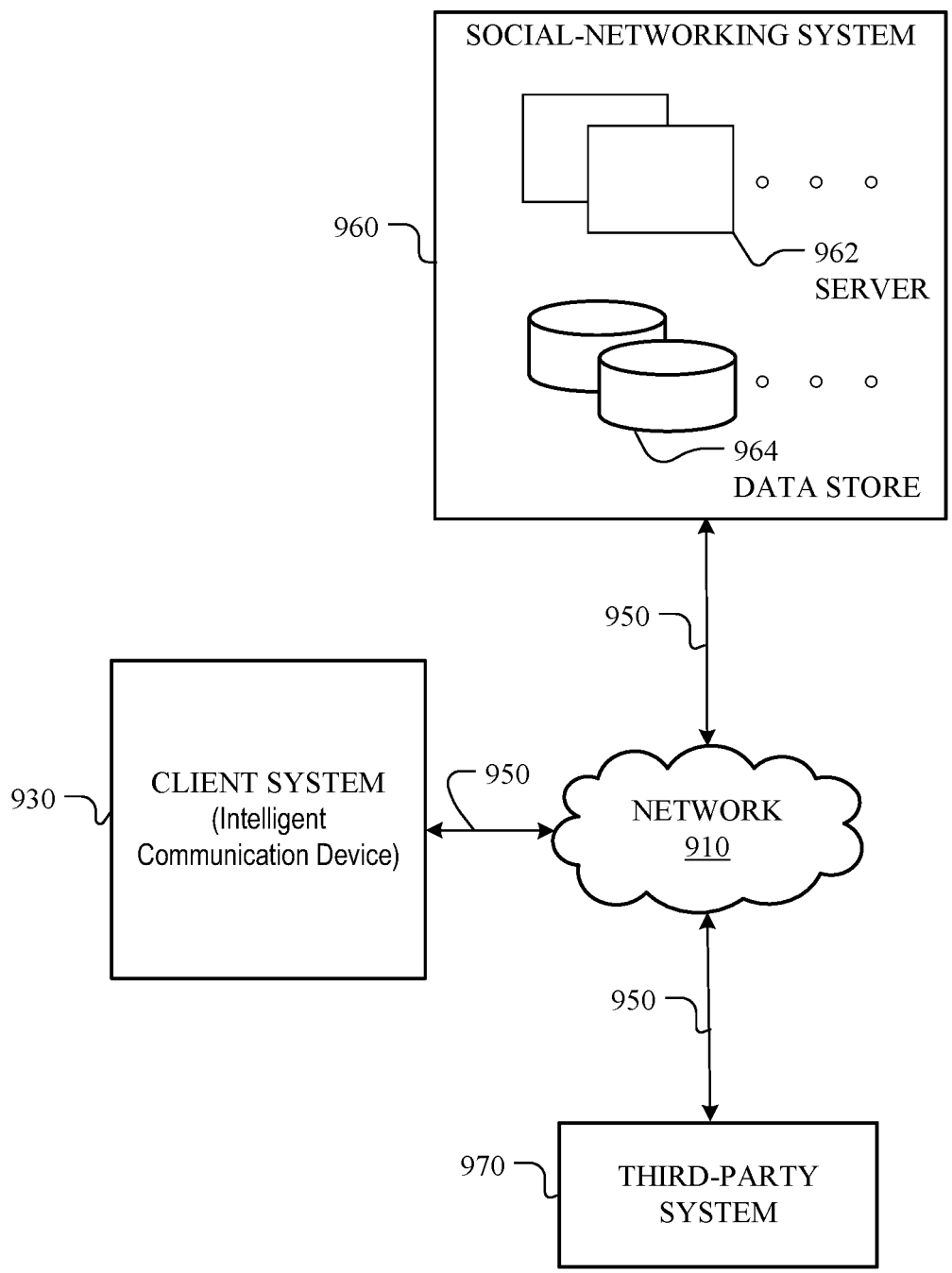
FIG. 9 illustrates an example network environment associated with a social-networking system.

FIG. 9 illustrates an example network environment 900 associated with a social-networking system. Network environment 900 includes a client system 930, a social-networking system 960, and a third-party system 970 connected to each other by a network 910. In particular embodiments, client system 930 may be an intelligent communication device, such as intelligent communication device 130, that includes internal processing capability that enables it to apply user-specific audio/visual customizations using multimodal biometric characterization. Although FIG. 9 illustrates a particular arrangement of client system 930, social-networking system 960, third-party system 970, and network 910, this disclosure contemplates any suitable arrangement of client system 930, social-networking system 960, third-party system 970, and network 910. As an example and not by way of limitation, two or more of client system 930, social-networking system 960, and third-party system 970 may be connected to each other directly, bypassing network 910. As another example, two or more of client system 930, social-networking system 960, and third-party system 970 may be physically or logically co-located with each other in whole or in part. Moreover, although FIG. 9 illustrates a particular number of client systems 930, social-networking systems 960, third-party systems 970, and networks 910, this disclosure contemplates any suitable number of client systems 930, social-networking systems 960, third-party systems 970, and networks 910. As an example and not by way of limitation, network environment 900 may include multiple client system 930, social-networking systems 960, third-party systems 970, and networks 910.

This disclosure contemplates any suitable network 910. As an example and not by way of limitation, one or more portions of network 910 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 910 may include one or more networks 910.

Links 950 may connect client system 930, social-networking system 960, and third-party system 970 to communication network 910 or to each other. This disclosure contemplates any suitable links 950. In particular embodiments, one or more links 950 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 950 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 950, or a combination of two or more such links 950. Links 950 need not necessarily be the same throughout network environment 900. One or more first links 950 may differ in one or more respects from one or more second links 950.

In particular embodiments, client system 930 may be an electronic device including hardware, software, or embedded logic components or a combination of two or more such components and capable of carrying out the appropriate functionalities implemented or supported by client system 930. As an example and not by way of limitation, a client system 930 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 930. A client system 930 may enable a network user at client system 930 to access network 910. A client system 930 may enable its user to communicate with other users at other client systems 930.

In particular embodiments, client system 930 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 930 may enter a Uniform Resource Locator (URL) or other address directing the web browser 932 to a particular server (such as server 962, or a server associated with a third-party system 970), and the web browser 932 may generate a Hyper Text Transfer Protocol (HTTP) request and communicate the HTTP request to server. The server may accept the HTTP request and communicate to client system 930 one or more Hyper Text Markup Language (HTML) files responsive to the HTTP request. Client system 930 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 960 may be a network-addressable computing system that can host an online social network. Social-networking system 960 may generate, store, receive, and send social-networking data, such as, for example, user-profile data, concept-profile data, social-graph information, or other suitable data related to the online social network. Social-networking system 960 may be accessed by the other components of network environment 900 either directly or via network 910. As an example and not by way of limitation, client system 930 may access social-networking system 960 using a web browser 932, or a native application associated with social-networking system 960 (e.g., a mobile social-networking application, a messaging application, another suitable application, or any combination thereof) either directly or via network 910. In particular embodiments, social-networking system 960 may include one or more servers 962. Each server 962 may be a unitary server or a distributed server spanning multiple computers or multiple datacenters. Servers 962 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 962 may include hardware, software, or embedded logic components or a combination of two or more such components for carrying out the appropriate functionalities implemented or supported by server 962. In particular embodiments, social-networking system 960 may include one or more data stores 964. Data stores 964 may be used to store various types of information. In particular embodiments, the information stored in data stores 964 may be organized according to specific data structures. In particular embodiments, each data store 964 may be a relational, columnar, correlation, or other suitable database. Although this disclosure describes or illustrates particular types of databases, this disclosure contemplates any suitable types of databases. Particular embodiments may provide interfaces that enable a client system 930, a social-networking system 960, or a third-party system 970 to manage, retrieve, modify, add, or delete, the information stored in data store 964.

In particular embodiments, social-networking system 960 may store one or more social graphs in one or more data stores 964. In particular embodiments, a social graph may include multiple nodes, which may include multiple user nodes (each corresponding to a particular user) or multiple concept nodes (each corresponding to a particular concept), and multiple edges connecting the nodes. Social-networking system 960 may provide users of the online social network the ability to communicate and interact with other users. In particular embodiments, users may join the online social network via social-networking system 960 and then add connections (e.g., relationships) to a number of other users of social-networking system 960 to whom they want to be connected. Herein, the term "friend" may refer to any other user of social-networking system 960 with whom a user has formed a connection, association, or relationship via social-networking system 960.

In particular embodiments, social-networking system 960 may provide users with the ability to take actions on various types of items or objects, supported by social-networking system 960. As an example and not by way of limitation, the items and objects may include groups or social networks to which users of social-networking system 960 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 960 or by an external system of third-party system 970, which is separate from social-networking system 960 and coupled to social-networking system 960 via a network 910.

In particular embodiments, social-networking system 960 may be capable of linking a variety of entities. As an example and not by way of limitation, social-networking system 960 may enable users to interact with each other as well as receive content from third-party systems 970 or other entities, or to allow users to interact with these entities through an application programming interfaces (API) or other communication channels.

In particular embodiments, a third-party system 970 may include one or more types of servers, one or more data stores, one or more interfaces, including but not limited to APIs, one or more web services, one or more content sources, one or more networks, or any other suitable components, e.g., that servers may communicate with. A third-party system 970 may be operated by a different entity from an entity operating social-networking system 960. In particular embodiments, however, social-networking system 960 and third-party systems 970 may operate in conjunction with each other to provide social-networking services to users of social-networking system 960 or third-party systems 970. In this sense, social-networking system 960 may provide a platform, or backbone, which other systems, such as third-party systems 970, may use to provide social-networking services and functionality to users across the Internet.

In particular embodiments, a third-party system 970 may include a third-party content object provider. A third-party content object provider may include one or more sources of content objects, which may be communicated to a client system 930. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 960 also includes user-generated content objects, which may enhance a user's interactions with social-networking system 960. User-generated content may include anything a user can add, upload, send, or "post" to social-networking system 960. As an example and not by way of limitation, a user communicates posts to social-networking system 960 from a client system 930. Posts may include data such as status updates or other textual data, location information, photos, videos, links, music or other similar data or media. Content may also be added to social-networking system 960 by a third-party through a "communication channel," such as a newsfeed or stream.

In particular embodiments, social-networking system 960 may include a variety of servers, sub-systems, programs, modules, logs, and data stores. In particular embodiments, social-networking system 960 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 960 may also include suitable components such as network interfaces, security mechanisms, load balancers, failover servers, management-and-network-operations consoles, other suitable components, or any suitable combination thereof. In particular embodiments, social-networking system 960 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 960 to one or more client systems 930 or one or more third-party system 970 via network 910. The web server may include a mail server or other messaging functionality for receiving and routing messages between social-networking system 960 and one or more client systems 930. An API-request server may allow a third-party system 970 to access information from social-networking system 960 by calling one or more APIs. An action logger may be used to receive communications from a web server about a user's actions on or off social-networking system 960. In conjunction with the action log, a third-party-content-object log may be maintained of user exposures to third-party-content objects. A notification controller may provide information regarding content objects to a client system 930. Information may be pushed to a client system 930 as notifications, or information may be pulled from client system 930 responsive to a request received from client system 930. Authorization servers may be used to enforce one or more privacy settings of the users of social-networking system 960. A privacy setting of a user determines how particular information associated with a user can be shared. The authorization server may allow users to opt in to or opt out of having their actions logged by social-networking system 960 or shared with other systems (e.g., third-party system 970), such as, for example, by setting appropriate privacy settings. Third-party-content-object stores may be used to store content objects received from third parties, such as a third-party system 970. Location stores may be used for storing location information received from client systems 930 associated with users. Advertisement-pricing modules may combine social information, the current time, location information, or other suitable information to provide relevant advertisements, in the form of notifications, to a user.

Social Graphs

Figure 10:
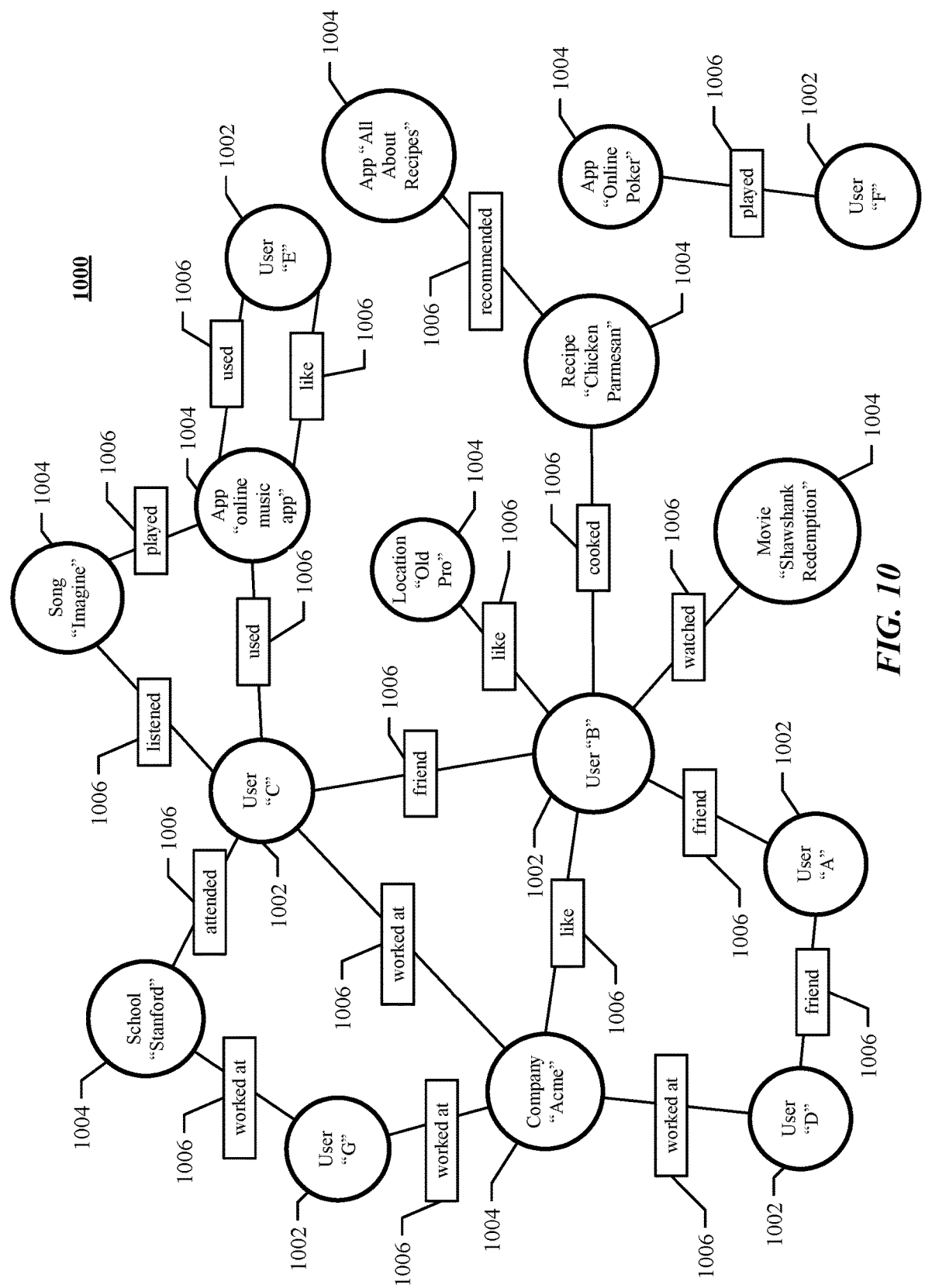
FIG. 10 illustrates an example social graph.

FIG. 10 illustrates example social graph 1000. In particular embodiments, social-networking system 960 may store one or more social graphs 1000 in one or more data stores. In particular embodiments, social graph 1000 may include multiple nodes, which may include multiple user nodes 1002 or multiple concept nodes 1004, and multiple edges 1006 connecting the nodes. Each node may be associated with a unique entity (i.e., user or concept), each of which may have a unique identifier (ID), such as a unique number or username. Example social graph 1000 illustrated in FIG. 10 is shown, for didactic purposes, in a two-dimensional visual map representation. In particular embodiments, a social-networking system 960, client system 930, or third-party system 970 may access social graph 1000 and related social-graph information for suitable applications. The nodes and edges of social graph 1000 may be stored as data objects, for example, in a data store (such as a social-graph database). Such a data store may include one or more searchable or queryable indexes of nodes or edges of social graph 1000.

In particular embodiments, a user node 1002 may correspond to a user of social-networking system 960. As an example and not by way of limitation, a user may be an individual (human user), an entity (e.g., an enterprise, business, or third-party application), or a group (e.g., of individuals or entities) that interacts or communicates with or over social-networking system 960. In particular embodiments, when a user registers for an account with social-networking system 960, social-networking system 960 may create a user node 1002 corresponding to the user, and may store the user node 1002 in one or more data stores. Users and user nodes 1002 described herein may, where appropriate, refer to registered users and user nodes 1002 associated with registered users. In addition, or as an alternative, users and user nodes 1002 described herein may, where appropriate, refer to users that have not registered with social-networking system 960. In particular embodiments, a user node 1002 may be associated with information provided by a user or information gathered by various systems, including social-networking system 960. As an example and not by way of limitation, a user may provide his or her name, profile picture, contact information, birth date, sex, marital status, family status, employment, education background, preferences, interests, or other demographic information. In particular embodiments, a user node 1002 may be associated with one or more data objects corresponding to information associated with a user. In particular embodiments, a user node 1002 may correspond to one or more webpages.

In particular embodiments, a concept node 1004 may correspond to a concept. As an example and not by way of limitation, a concept may correspond to a place (such as, for example, a movie theater, restaurant, landmark, or city); a website (such as, for example, a website associated with social-network system 960 or a third-party website associated with a web-application server); an entity (such as, for example, a person, business, group, sports team, or celebrity); a resource (such as, for example, an audio file, video file, digital photo, text file, structured document, or application) which may be located within social-networking system 960 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 1004 may be associated with information of a concept provided by a user or information gathered by various systems, including social-networking system 960. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social-networking system 960. Profile pages may also be hosted on third-party websites associated with a third-party system 970. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 970. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 930 to send to social-networking system 960 a message indicating the user's action. In response to the message, social-networking system 960 may create an edge (e.g., a check-in-type edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social-networking system 960 may send a "friend request" to the second user. If the second user confirms the "friend request," social-networking system 960 may create an edge 1006 connecting the first user's user node 1002 to the second user's user node 1002 in social graph 1000 and store edge 1006 as social-graph information in one or more of data stores 964. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006. The degree of separation between two objects represented by two nodes, respectively, is a count of edges in a shortest path connecting the two nodes in the social graph 1000. As an example and not by way of limitation, in the social graph 1000, the user node 1002 of user "C" is connected to the user node 1002 of user "A" via multiple paths including, for example, a first path directly passing through the user node 1002 of user "B," a second path passing through the concept node 1004 of company "Acme" and the user node 1002 of user "D," and a third path passing through the user nodes 1002 and concept nodes 1004 representing school "Stanford," user "G," company "Acme," and user "D." User "C" and user "A" have a degree of separation of two because the shortest path connecting their corresponding nodes (i.e., the first path) includes two edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to an edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social-networking system 960 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 960 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social-networking system 960 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social-networking system 960 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 930) may indicate that he or she likes the concept represented by the concept node 1004 by clicking or selecting a "Like" icon, which may cause the user's client system 930 to send to social-networking system 960 a message indicating the user's liking of the concept associated with the concept-profile page. In response to the message, social-networking system 960 may create an edge 1006 between user node 1002 associated with the user and concept node 1004, as illustrated by "like" edge 1006 between the user and concept node 1004. In particular embodiments, social-networking system 960 may store an edge 1006 in one or more data stores. In particular embodiments, an edge 1006 may be automatically formed by social-networking system 960 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, social-networking system 960 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 970 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 960 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 960 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 960 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 960 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 960 may calculate a coefficient based on a user's actions. Social-networking system 960 may monitor such actions on the online social network, on a third-party system 970, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 960 may calculate a coefficient based on the user's actions with particular types of content. The content may be associated with the online social network, a third-party system 970, or another suitable system. The content may include users, profile pages, posts, news stories, headlines, instant messages, chat room conversations, emails, advertisements, pictures, video, music, other suitable objects, or any combination thereof. Social-networking system 960 may analyze a user's actions to determine whether one or more of the actions indicate an affinity for subject matter, content, other users, and so forth. As an example and not by way of limitation, if a user frequently posts content related to "coffee" or variants thereof, social-networking system 960 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 960 may calculate a coefficient based on the type of relationship between particular objects. Referencing the social graph 1000, social-networking system 960 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than a user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 960 may determine that the user has a higher coefficient with respect to the first photo than the second photo because having a tagged-in-type relationship with content may be assigned a higher weight and/or rating than having a like-type relationship with content. In particular embodiments, social-networking system 960 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 960 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social-networking system 960 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 930 of the user). A first user may be more interested in other users or concepts that are closer to the first user. As an example and not by way of limitation, if a user is one mile from an airport and two miles from a gas station, social-networking system 960 may determine that the user has a higher coefficient for the airport than the gas station based on the proximity of the airport to the user.

In particular embodiments, social-networking system 960 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 960 may provide information that is relevant to user's interests and current circumstances, increasing the likelihood that they will find such information of interest. In particular embodiments, social-networking system 960 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 960 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 960 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 970 (e.g., via an API or other communication channel), or from another suitable system. In response to the request, social-networking system 960 may calculate the coefficient (or access the coefficient information if it has previously been calculated and stored). In particular embodiments, social-networking system 960 may measure an affinity with respect to a particular process. Different processes (both internal and external to the online social network) may request a coefficient for a particular object or set of objects. Social-networking system 960 may provide a measure of affinity that is relevant to the particular process that requested the measure of affinity. In this way, each process receives a measure of affinity that is tailored for the different context in which the process will use the measure of affinity.

Artificial Neural Networks

In particular embodiments, a computing device, such as intelligent communication device 130, may use an artificial neural network to learn that various biometric characteristics are associated with particular persons detected in an AV communication session. For example, an artificial neural network may be used to learn facial recognition results, voice recognition results, speech patterns, behavior patterns, typical gaits, poses, gestures, and other movements, and to learn combinations of biometric characteristics that can be used to identify particular persons in order to apply appropriate customizations. As the device determines more and more biometric characteristics and links them by associating them with unique user identifiers, the artificial neural network may develop increased confidence in the biometric characteristics, in a learning aspect. For example, if the device knows, due to facial recognition, that a particular person is standing in front of the device and that person begins talking, the device can determine the direction from which the sound of their voice is coming and, thus, who is talking. In this case, the device can connect the sound with the user identifier for the person and learn to recognize the voice and/or speech patterns associated with that user identifier (or vice versa). Once the device develops confidence in the user identifier of the person, that can be used to feed back into the other recognition systems to improve them. In particular embodiments, it might also be possible to use the multimodal biometrics described herein in spoofing detection, e.g., by detecting when a facial recognition signal and a voice recognition signal do not match those stored in association with a single user identifier. In particular embodiments, artificial intelligence or machine learning, as performed by an artificial neural network, may be used to create, train, and update the descriptive model for an AV communication session. For example, the artificial neural network may encode inputs when a person is detected, turning the inputs into machine-identifiable features, and compare them with the model.

Figure 11:
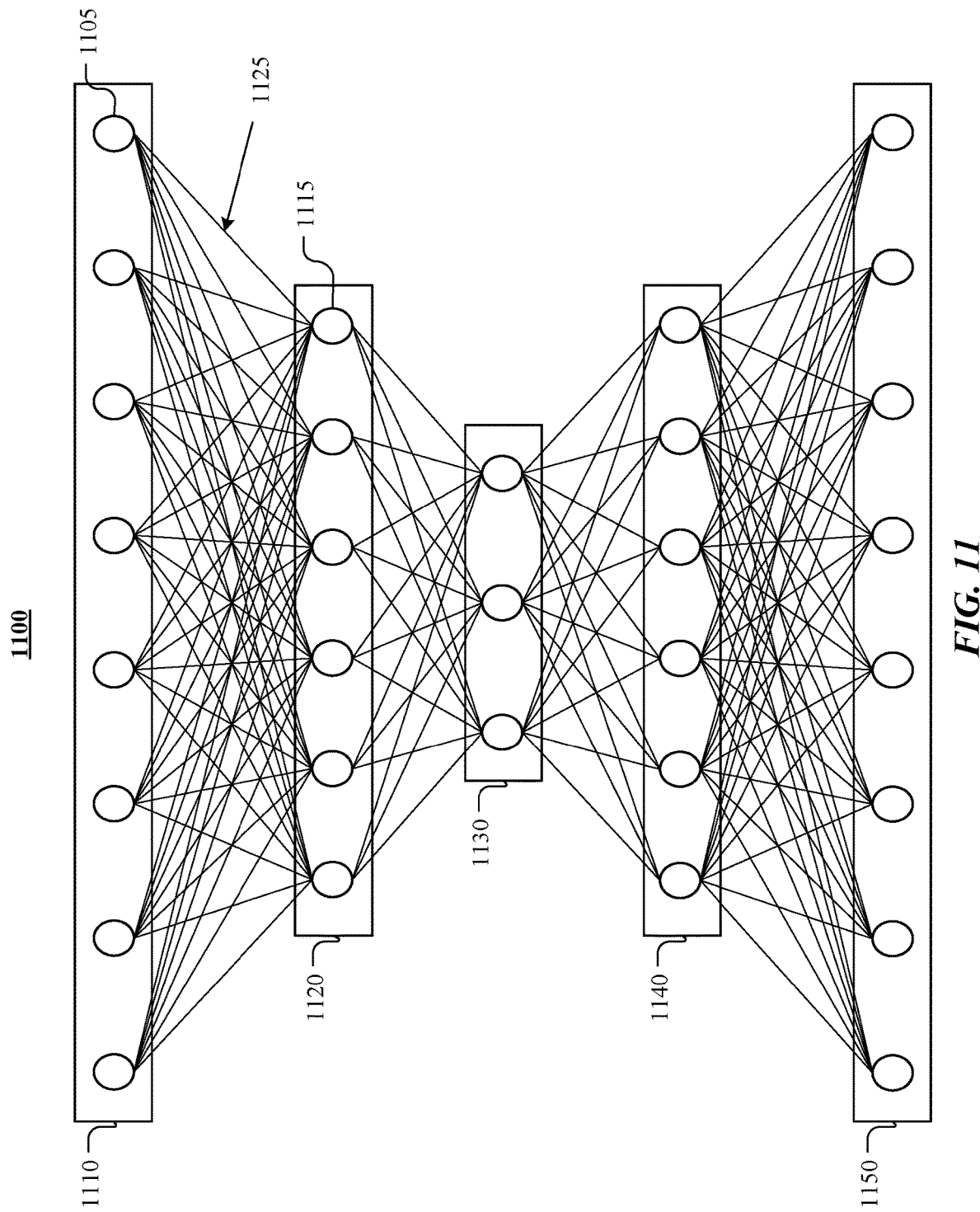
FIG. 11 illustrates an example artificial neural network.

FIG. 11 illustrates an example artificial neural network ("ANN") 1100. In particular embodiments, an ANN may refer to a computational model comprising one or more nodes. Example ANN 1100 may comprise an input layer 1110, hidden layers 1120, 1130, 1140, and an output layer 1150. Each layer of the ANN 1100 may comprise one or more nodes, such as a node 1105 or a node 1115. In particular embodiments, each node of an ANN may be connected to another node of the ANN. As an example and not by way of limitation, each node of the input layer 1110 may be connected to one of more nodes of the hidden layer 1120. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 11 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 11 depicts a connection between each node of the input layer 1110 and each node of the hidden layer 1120, one or more nodes of the input layer 1110 may not be connected to one or more nodes of the hidden layer 1120.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1120 may comprise the output of one or more nodes of the input layer 1110. As another example and not by way of limitation, the input to each node of the output layer 1150 may comprise the output of one or more nodes of the hidden layer 1140. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k) = \max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1125 between the node 1105 and the node 1115 may have a weighting coefficient of 0.4, which may indicate that 0.4 multiplied by the output of the node 1105 is used as an input to the node 1115. As another example and not by way of limitation, the output $y_k$ of node k may be $y_k = F_k(s_k)$, where $F_k$ may be the activation function corresponding to node k, $s_k = \Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1100 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 960, a client system 930, a third-party system 970, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object)

can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 1004 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 960 or shared with other systems (e.g., a third-party system 970). Although this disclosure describes using particular privacy settings in a particular manner, this disclosure contemplates using any suitable privacy settings in any suitable manner.

In particular embodiments, privacy settings may be based on one or more nodes or edges of a social graph 1000. A privacy setting may be specified for one or more edges 1006 or edge-types of the social graph 1000, or with respect to one or more nodes 1002, 1004 or node-types of the social graph 1000. The privacy settings applied to a particular edge 1006 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 960. The object may be associated with a concept node 1004 connected to a user node 1002 of the first user by an edge 1006. The first user may specify privacy settings that apply to a particular edge 1006 connecting to the concept node 1004 of the object, or may specify privacy settings that apply to all edges 1006 connecting to the concept node 1004. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 960 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 960 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 970, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 962 may be authorization/privacy servers for enforcing privacy settings. In response to a request from a user (or other entity) for a particular object stored in a data store 964, the social-networking system 960 may send a request to the data store 964 for the object. The request may identify the user associated with the request and the object may be sent only to the user (or a client system 930 of the user) if the authorization server determines that the user is authorized to access the object based on the privacy settings associated with the object. If the requesting user is not authorized to access the object, the authorization server may prevent the requested object from being retrieved from the data store 964 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 960, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 960 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 960 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 960 may access such information in order to provide a particular function or service to the first user, without the social-networking system 960 having access to that information for any other purposes. Before accessing, storing, or using such objects or information, the social-networking system 960 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 960.

In particular embodiments, a user may specify whether particular types of objects or information associated with the first user may be accessed, stored, or used by the social-networking system 960. As an example and not by way of limitation, the first user may specify that images sent by the first user through the social-networking system 960 may not be stored by the social-networking system 960. As another example and not by way of limitation, a first user may specify that messages sent from the first user to a particular second user may not be stored by the social-networking system 960. As yet another example and not by way of limitation, a first user may specify that all objects sent via a particular application may be saved by the social-networking system 960.

In particular embodiments, privacy settings may allow a first user to specify whether particular objects or information associated with the first user may be accessed from particular client systems 930 or third-party systems 970. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 960 may provide default privacy settings with respect to each device, system, or application, and/or the first user may be prompted to specify a particular privacy setting for each context. As an example and not by way of limitation, the first user may utilize a location-services feature of the social-networking system 960 to provide recommendations for restaurants or other places in proximity to the user. The first user's default privacy settings may specify that the social-networking system 960 may use location information provided from a client device 930 of the first user to provide the location-based services, but that the social-networking system 960 may not store the location information of the first user or provide it to any third-party system 970. The first user may then update the privacy settings to allow location information to be used by a third-party image-sharing application in order to geo-tag photos.

Privacy Settings Based on Location

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

Privacy Settings for Mood or Sentiment Information

In particular embodiments, privacy settings may allow a user to specify whether mood or sentiment information associated with the user may be determined, and whether particular applications or processes may access, store, or use such information. The privacy settings may allow users to opt in or opt out of having mood or sentiment information accessed, stored, or used by specific applications or processes. The social-networking system 960 may predict or determine a mood or sentiment associated with a user based on, for example, inputs provided by the user and interactions with particular objects, such as pages or content viewed by the user, posts or other content uploaded by the user, and interactions with other content of the online social network. In particular embodiments, the social-networking system 960 may use a user's previous activities and calculated moods or sentiments to determine a present mood or sentiment. A user who wishes to enable this functionality may indicate in their privacy settings that they opt in to the social-networking system 960 receiving the inputs necessary to determine the mood or sentiment. As an example and not by way of limitation, the social-networking system 960 may determine that a default privacy setting is to not receive any information necessary for determining mood or sentiment until there is an express indication from a user that the social-networking system 960 may do so. By contrast, if a user does not opt in to the social-networking system 960 receiving these inputs (or affirmatively opts out of the social-networking system 960 receiving these inputs), the social-networking system 960 may be prevented from receiving, collecting, logging, or storing these inputs or any information associated with these inputs. In particular embodiments, the social-networking system 960 may use the predicted mood or sentiment to provide recommendations or advertisements to the user. In particular embodiments, if a user desires to make use of this function for specific purposes or applications, additional privacy settings may be specified by the user to opt in to using the mood or sentiment information for the specific purposes or applications. As an example and not by way of limitation, the social-networking system 960 may use the user's mood or sentiment to provide newsfeed items, pages, friends, or advertisements to a user. The user may specify in their privacy settings that the social-networking system 960 may determine the user's mood or sentiment. The user may then be asked to provide additional privacy settings to indicate the purposes for which the user's mood or sentiment may be used. The user may indicate that the social-networking system 960 may use his or her mood or sentiment to provide newsfeed content and recommend pages, but not for recommending friends or advertisements. The social-networking system 960 may then only provide newsfeed content or pages based on user mood or sentiment, and may not use that information for any other purpose, even if not expressly prohibited by the privacy settings.

Privacy Settings for User Authentication and Experience Personalization Information In particular embodiments, the social-networking system 960 or a client system 130 may have functionalities that may use, as inputs, personal or biometric information of a user for user-authentication or experience-personalization purposes, such as for user-specific customizations, as described herein. A user may opt to make use of these functionalities to enhance their experience on the online social network. As an example and not by way of limitation, a user may provide personal or biometric information to the social-networking system 960 or client system 130. The user's privacy settings may specify that such information may be used only for particular processes, such as authentication, and further specify that such information may not be shared with any third-party system 970 or used for other processes or applications associated with the social-networking system 960. As another example and not by way of limitation, the social-networking system 960 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 970 or used by other processes or applications associated with the social-networking system 960. As another example and not by way of limitation, the social-networking system 960 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system 970 or used by other processes or applications associated with the social-networking system 960.

User-Initiated Changes to Privacy Settings

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system 960 may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system 960 may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system 960 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system 960 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system 960 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system 960 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system 960 may send a reminder to the user to confirm his or her privacy settings every six months or after every ten photo posts. In particular embodiments, privacy settings may also allow users to control access to the objects or information on a per-request basis. As an example and not by way of limitation, the social-networking system 960 may notify the user whenever a third-party system 970 attempts to access information associated with the user, and require the user to provide verification that access should be allowed before proceeding.

Systems and Methods

Figure 12:
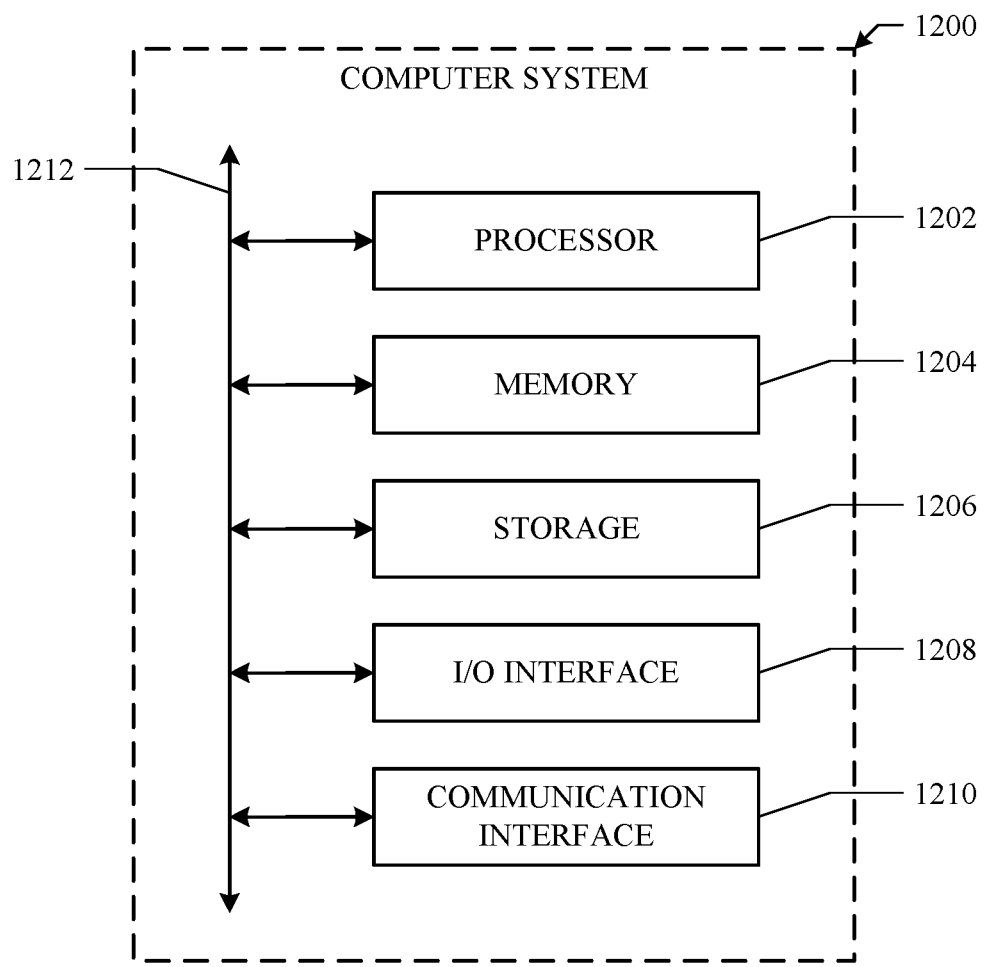
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, a depth sensor, a geolocation sensor, a biometric sensor, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a device:
   detecting that a person is visible to a camera of the device;
   determining a first biometric characteristic of the person discernable by the device;
   associating the first biometric characteristic with a user identifier unique to the person;
   determining, while the person is identifiable based on the first biometric characteristic, a second biometric characteristic of the person discernable by the device;
   associating the second biometric characteristic with the user identifier;
   determining that a detected person has a detected biometric characteristic;
   determining, with a given degree of confidence, that the detected person is associated with the user identifier by matching the detected biometric characteristic to the first biometric characteristic or the second biometric characteristic, wherein the given degree of confidence is higher when both the first and second biometric characteristics of the detected person are discernable by the device than when only one of the first and second biometric characteristics of the detected person is discernable by the device; and
   applying, while the detected person is identifiable based on the detected biometric characteristic, a user-specific customization associated with the user identifier.

2. The method of claim 1, wherein:
   the first biometric characteristic represents a facial recognition result identifying the detected person; and
   the method further comprises associating the user identifier with the detected person in response to the identifying.

3. The method of claim 1, wherein at least one of the first biometric characteristic or the second biometric characteristic represents a persistent attribute of the detected person discernable in video or audio data captured by the camera or in data received from a biometric sensor of the device other than the camera.

4. The method of claim 1, wherein:
   at least one of the first biometric characteristic or the second biometric characteristic represents a transient attribute of the detected person discernable in video or audio data captured by the camera or in data received from a biometric sensor of the device other than the camera; and
   the user-specific customization is dependent on the transient attribute.

5. The method of claim 1, wherein:
   at least one of the first biometric characteristic or the second biometric characteristic represents a current contextual attribute of the detected person discernable in video or audio data captured by the camera or in data received from a biometric sensor of the device other than the camera; and
   the user-specific customization is dependent on the current contextual attribute.

6. The method of claim 1, further comprising:
   determining, while the detected person is identifiable based on at least one of the first biometric characteristic or the second biometric characteristic, a third biometric characteristic of the person discernable by the device;
   associating the third biometric characteristic with the user identifier; and subsequent to associating the third biometric characteristic with the user identifier, identifying, with a given degree of confidence and while the detected person is identifiable based on the third biometric characteristic, the detected person, wherein the given degree of confidence is higher when at least one of the first biometric characteristic of the detected person or the second biometric characteristic of the detected person is also discernable by the device than when only the third biometric characteristic is discernable by the device.

7. The method of claim 1, wherein applying the user-specific customization comprises modifying the appearance of the detected person or an attribute of the voice of the detected person in a video stream output by the device.

8. The method of claim 1, wherein applying the user-specific customization comprises modifying a visual or audible attribute of a scene in which the detected person appears in a video stream output by the device.

9. The method of claim 1, further comprising:
storing a plurality of biometric characteristics of the detected person in association with the user identifier in a data structure, the data structure storing information representing one or more persons visible to the camera including the detected person, and the plurality of biometric characteristics including the first and second biometric characteristics;
obtaining biometric data from the camera or from a biometric sensor of the device other than the camera; and
updating the plurality of biometric characteristics of the detected person stored in association with the user identifier in the data structure dependent on the obtained biometric data.

10. The method of claim 9, wherein obtaining the biometric data comprises:
determining that a trigger condition for updating the plurality of biometric characteristics of the detected person stored in association with the user identifier in the data structure has been met; and
requesting, in response to determining that the trigger condition has been met, current biometric data from the camera or from the biometric sensor of the device other than the camera.

11. A system, comprising:
one or more processors; and
one or more computer-readable non-transitory storage media coupled to one or more of the processors and comprising program instructions operable when executed by one or more of the processors to cause the system to:
detect that a person is visible to a camera of a device;
determine a first biometric characteristic of the person discernable by the device;
associate the first biometric characteristic with a user identifier unique to the person;
determine, while the person is identifiable based on the first biometric characteristic, a second biometric characteristic of the person discernable by the device;
associate the second biometric characteristic with the user identifier;
determine that a detected person has a detected biometric characteristic;
determine, with a given degree of confidence, that the detected person is associated with the user identifier by matching the detected biometric characteristic to the first biometric characteristic or the second biometric characteristic, wherein the given degree of confidence is higher when both the first and second biometric characteristics of the detected person are discernable by the device than when only one of the first and second biometric characteristics of the detected person is discernable by the device; and
apply, while the detected person is identifiable based on the detected biometric characteristic, a user-specific customization associated with the user identifier.

12. The system of claim 11, wherein:
at least one of the first biometric characteristic or the second biometric characteristic represents a transient attribute or a current contextual attribute of the detected person discernable in video or audio data captured by the camera or in data received from a biometric sensor of the device other than the camera; and
the user-specific customization is dependent on the transient attribute or the current contextual attribute.

13. The system of claim 11, wherein to apply the user-specific customization, the program instructions are further operable to cause the system to:
modify the appearance of the detected person or an attribute of the voice of the detected person in a video stream output by the device; or
modify a visual or audible attribute of a scene in which the detected person appears in a video stream output by the device.

14. The system of claim 11, wherein when executed by the one or more of the processors, the program instructions are further operable to cause the system to:
store a plurality of biometric characteristics of the detected person in association with the user identifier in a data structure, the data structure storing information representing one or more persons visible to the camera including the detected person, and the plurality of biometric characteristics including the first and second biometric characteristics;
obtain biometric data from the camera or from a biometric sensor of the device other than the camera; and
update the plurality of biometric characteristics of the detected person stored in association with the user identifier in the data structure dependent on the obtained biometric data.

15. One or more computer-readable non-transitory storage media embodying software that is operable when executed to:
detect that a person is visible to a camera of a device;
determine a first biometric characteristic of the person discernable by the device;
associate the first biometric characteristic with a user identifier unique to the person;
determine, while the person is identifiable based on the first biometric characteristic, a second biometric characteristic of the person discernable by the device;
associate the second biometric characteristic with the user identifier;
determine that a detected person has a detected biometric characteristic;
determine, with a given degree of confidence, that the detected person is associated with the user identifier by matching the detected biometric characteristic to the first biometric characteristic or the second biometric characteristic, wherein the given degree of confidence is higher when both the first and second biometric characteristics of the detected person are discernable by the device than when only one of the first and second biometric characteristics of the detected person is discernable by the device; and apply, while the detected person is identifiable based on the detected biometric characteristic, a user-specific customization associated with the user identifier.

16. The media of claim 15, wherein:

at least one of the first biometric characteristic or the second biometric characteristic represents a transient attribute or a current contextual attribute of the detected person discernable in video or audio data captured by the camera or in data received from a biometric sensor of the device other than the camera; and the user-specific customization is dependent on the transient attribute or the current contextual attribute.

17. The media of claim 15, wherein to apply the user-specific customization, the software is further operable to:

modify the appearance of the detected person or an attribute of the voice of the detected person in a video stream output by the device; or modify a visual or audible attribute of a scene in which the detected person appears in a video stream output by the device.

18. The media of claim 15, wherein, when executed, the software is further operable to:

store a plurality of biometric characteristics of the detected person in association with the user identifier in a data structure, the data structure storing information representing one or more persons visible to the camera including the detected person, and the plurality of biometric characteristics including the first and second biometric characteristics;

obtain biometric data from the camera or from a biometric sensor of the device other than the camera; and update the plurality of biometric characteristics of the detected person stored in association with the user identifier in the data structure dependent on the obtained biometric data.

* * * * *